United States Patent
Yada

(10) Patent No.: US 9,986,591 B2
(45) Date of Patent: May 29, 2018

(54) FUNCTION EXECUTION APPARATUS

(71) Applicant: Brother Kogyo Kabushiki Kaisha, Nagoya-shi, Aichi-ken (JP)

(72) Inventor: Yuki Yada, Kuwana (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 84 days.

(21) Appl. No.: 14/337,572

(22) Filed: Jul. 22, 2014

(65) Prior Publication Data

US 2015/0031404 A1      Jan. 29, 2015

(30) Foreign Application Priority Data

Jul. 23, 2013  (JP) .................................. 2013-152630

(51) Int. Cl.
*H04B 5/00*           (2006.01)
*H04B 7/00*           (2006.01)
(Continued)

(52) U.S. Cl.
CPC ....... *H04W 76/045* (2013.01); *H04W 76/066* (2013.01); *H04W 76/25* (2018.02); *H04W 76/36* (2018.02); *H04W 88/10* (2013.01)

(58) Field of Classification Search
CPC .. H04B 1/30; H04B 7/00; H04L 5/003; H04L 12/24; H04L 29/06; H04L 41/00; H04L 45/00; H04L 67/42; H04W 24/00; H04W 24/08; H04W 40/14; H04W 48/18; H04W 72/0446; H04W 72/1247; H04W 72/1278; H04W 76/021; H04W 76/045;
(Continued)

(56) References Cited

U.S. PATENT DOCUMENTS 5,740,160 A * 4/1998 Ikegami ................ H04W 8/26
                                                                370/255
5,901,362 A * 5/1999 Cheung ................ H04W 92/02
                                                                370/338

(Continued)

FOREIGN PATENT DOCUMENTS

JP    2001-326658 A    11/2001
JP    2002-185458 A     6/2002

(Continued)

*Primary Examiner* — Yuwen Pan
*Assistant Examiner* — Paul P Tran
(74) *Attorney, Agent, or Firm* — Banner & Witcoff, Ltd.

(57) ABSTRACT

There is provided a function execution apparatus which, when a wireless connection request is received from a specific device in a specific state where wireless connections are established between the function execution apparatus and N devices which are an upper limit number of devices, transmits an inquiry signal to each of K devices among the N devices to inquire whether each device which is a final transmission destination of the inquiry signal activates a specific application program for causing the function execution apparatus to execute a specific function; select a target device, for which the wireless connection is to be disconnected, among the K devices based on a result of the inquiry; disconnect a wireless connection with the target device; and establish a wireless connection with the specific device after the wireless connection with the target device is disconnected.

13 Claims, 9 Drawing Sheets

(51) Int. Cl.

| | | |
|---|---|---|
| *H04M 1/00* | (2006.01) | |
| *G06F 3/12* | (2006.01) | |
| *H04L 12/28* | (2006.01) | |
| *H04W 4/00* | (2018.01) | |
| *H04J 3/16* | (2006.01) | |
| *G06F 15/16* | (2006.01) | |
| *G06F 15/173* | (2006.01) | |
| *H04W 76/04* | (2009.01) | |
| *H04W 76/06* | (2009.01) | |
| *H04W 88/10* | (2009.01) | |

(58) Field of Classification Search
 CPC ... H04W 76/066; H04W 84/18; H04W 84/20; H04W 76/048; H04W 92/02; H04N 1/00; H04N 1/00323; H04N 1/00344; H04N 1/00875; H04N 1/00896; G06F 3/1206; G06F 3/1219; G06F 3/1221; G06F 3/1239; G06F 3/1247; G06F 3/1285; G06K 15/1806; G06K 15/1823; G06K 15/4005; G06K 15/4055; G06K 15/04
 USPC ......... 455/41.1, 41.2, 41.3, 343.3, 450, 507, 455/508, 527; 358/1.13, 1.15; 370/312, 370/328, 329, 338, 340, 342, 401, 449, 370/465, 466, 467; 375/133, 322; 709/201, 208, 223, 224
 See application file for complete search history.

(56) References Cited

U.S. PATENT DOCUMENTS

| | | | | |
|---|---|---|---|---|
| 6,829,487 | B2 * | 12/2004 | Eiden | H04L 12/185 455/519 |
| 2002/0089963 | A1 * | 7/2002 | Kang | H04W 8/26 370/340 |
| 2002/0090968 | A1 * | 7/2002 | Lee | H04W 72/1247 455/527 |
| 2002/0193073 | A1 * | 12/2002 | Fujioka | H04W 84/20 455/41.1 |
| 2003/0100335 | A1 * | 5/2003 | Gassho | H04L 12/5692 455/552.1 |
| 2004/0078449 | A1 * | 4/2004 | Tanaka | H04L 67/42 709/208 |
| 2004/0260808 | A1 * | 12/2004 | Strutt | H04L 45/00 709/224 |
| 2012/0105887 | A1 * | 5/2012 | Osaki | G06F 3/1219 358/1.13 |
| 2014/0307587 | A1 * | 10/2014 | Fayssal | H04L 41/0866 370/255 |

FOREIGN PATENT DOCUMENTS

| | | |
|---|---|---|
| JP | 2004-128709 A | 4/2004 |
| JP | 2007-142933 A | 6/2007 |

* cited by examiner

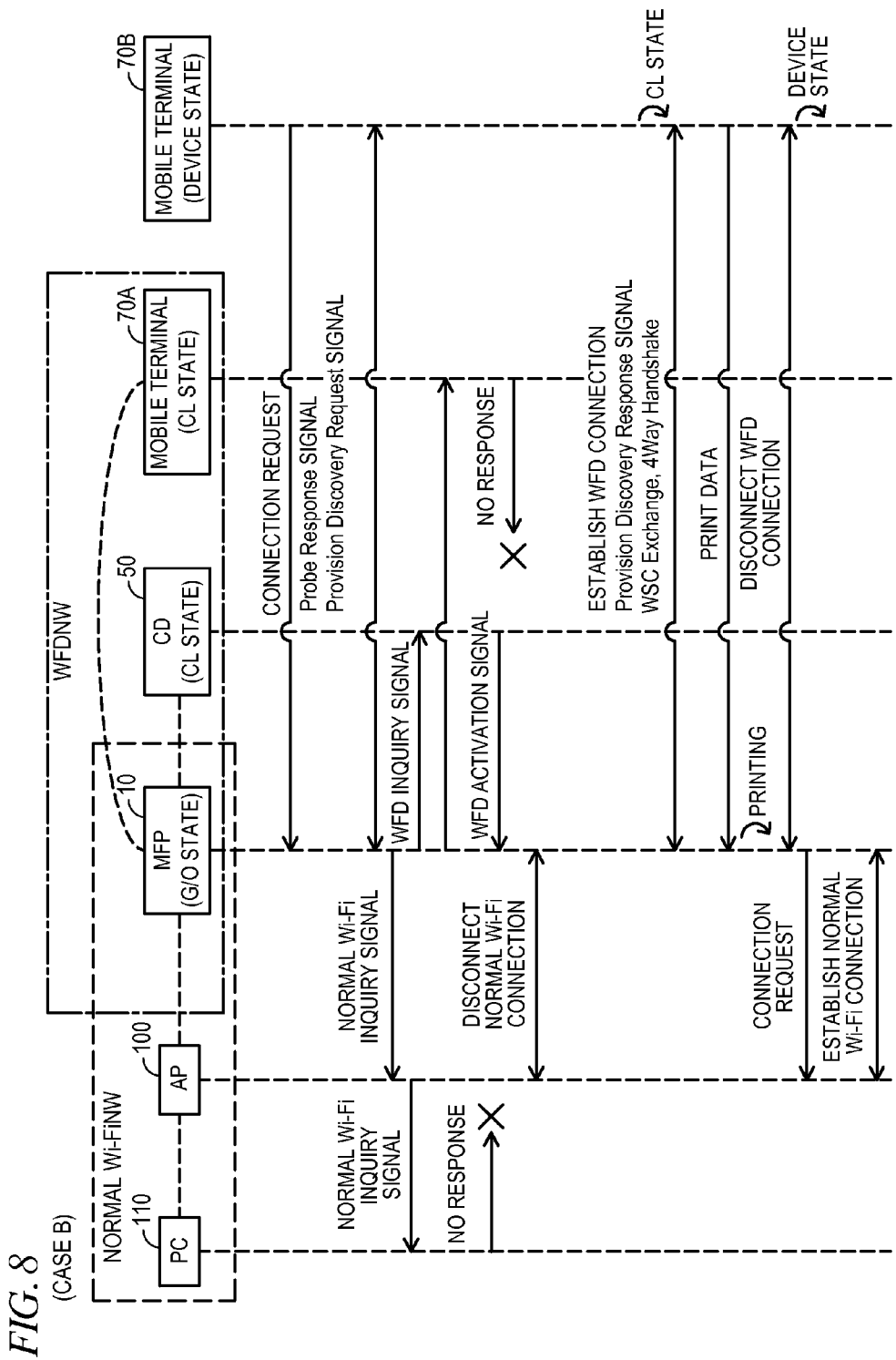
FIG. 8 (CASE B)

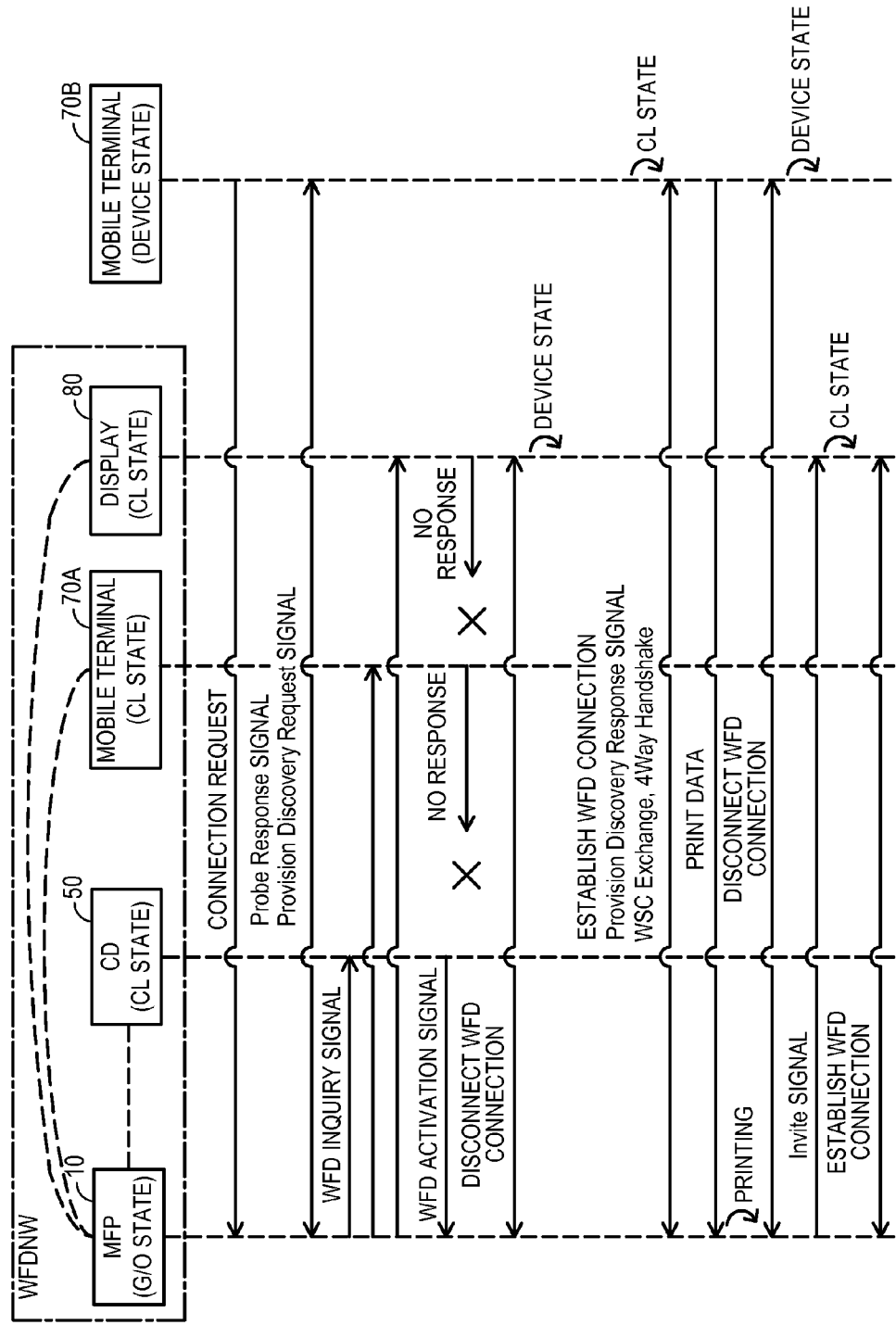
FIG. 9 (CASE C)

FUNCTION EXECUTION APPARATUS

CROSS-REFERENCE TO RELATED APPLICATION

This application claims priority from Japanese Patent Application No. 2013-152630, filed on Jul. 23, 2013, the entire subject matter of which is incorporated herein by reference.

TECHNICAL FIELD

This specification discloses a function execution apparatus which is able to execute a specific function.

BACKGROUND

JP-A-2001-326658 discloses a network which includes a plurality of communication apparatuses. A communication apparatus which manages the network (hereinafter, referred to as "management communication apparatus") confirms the number of connected communication apparatuses currently being connected to the network if a connection request is received from a communication apparatus outside the network. In a third embodiment of JP-A-2001-326658, when the number of connected communication apparatuses exceeds a predetermined value, the management communication apparatus determines whether there is a communication apparatus in a non-communication state, and disconnects the communication apparatus in the non-communication state from the network. As a modified embodiment for selecting a communication apparatus to be disconnected from the network, there is disclosed an embodiment where a communication apparatus with the longest connection time to the network is selected, an embodiment where a communication apparatus which has not accessed the network for the longest time is selected, an embodiment where a communication apparatus with the smallest amount of data transmission is selected, an embodiment where a communication apparatus with the lowest communication priority is selected, or the like.

SUMMARY

This specification provides a technique for establishing a wireless connection with a specific device using a new method when a function execution apparatus receives a wireless connection request from the specific device in a state where wireless connections with an upper limit number of devices are established.

According to an illustrative embodiment of the present invention, there is provided a function execution apparatus capable of executing a specific function, the function execution apparatus includes a controller. The controller is configured to, in a specific state where wireless connections are established between the function execution apparatus and N devices, receive a wireless connection request from a specific device different from the N devices, wherein N is an integer equal to or greater than 2 and is an upper limit number of devices with which the function execution apparatus is capable of establishing wireless connections simultaneously; when the wireless connection request is received from the specific device in the specific state, transmit an inquiry signal to each of K devices among the N devices to inquire whether each device which is a final transmission destination of the inquiry signal activates a specific application program for causing the function execution apparatus to execute the specific function, where K is an integer equal to or greater than 1 and equal to or less than N; select a target device, for which the wireless connection is to be disconnected, among the K devices based on a result of the inquiry; disconnect a wireless connection with the target device; and establish a wireless connection with the specific device after the wireless connection with the target device is disconnected.

According to the above configuration, when the function execution apparatus receives a wireless connection request from a specific device in a state where wireless connections with an upper limit number of devices (that is, N devices) are established, the function execution apparatus transmits an inquiry signal to each of the K devices and inquires whether each device which is a final transmission destination of the inquiry signal activates a specific application program. The function execution apparatus can appropriately select a target device, for which the wireless connection is to be disconnected, based on the inquiry result. The function execution apparatus disconnects the wireless connection with the target device. Accordingly, since the function execution apparatus establishes wireless connections with the N−1 devices, it is possible to establish a wireless connection with the specific device. That is, when the function execution apparatus receives the wireless connection request from the specific device in a state where wireless connections with the upper limit number of devices are established, it is possible to establish a wireless connection with the specific device using a new method.

The function execution apparatus may include a function execution unit which executes a specific function (for example, printing function). A control method for realizing the function of the function execution apparatus, a computer program, and a non-transitory computer-readable recording medium having the computer program recorded thereon are also new and useful. A system including the function execution apparatus and any one of the above-described devices (for example, any one of a first type slave station device, a second type slave station device, and an access point) is also new and useful. In particular, a system including the function execution apparatus and the specific slave station device connected to a general public line is new and useful.

BRIEF DESCRIPTION OF THE DRAWINGS

The above and other aspects of the present invention will become more apparent and more readily appreciated from the following description of illustrative embodiments of the present invention taken in conjunction with the attached drawings, in which:

FIG. 8 is a sequence diagram of a case B where an activation signal is not received from a PC and a mobile terminal; and FIG. 9 is a sequence diagram of a case C where an activation signal is not received from a mobile terminal and a display.

Figure 1:
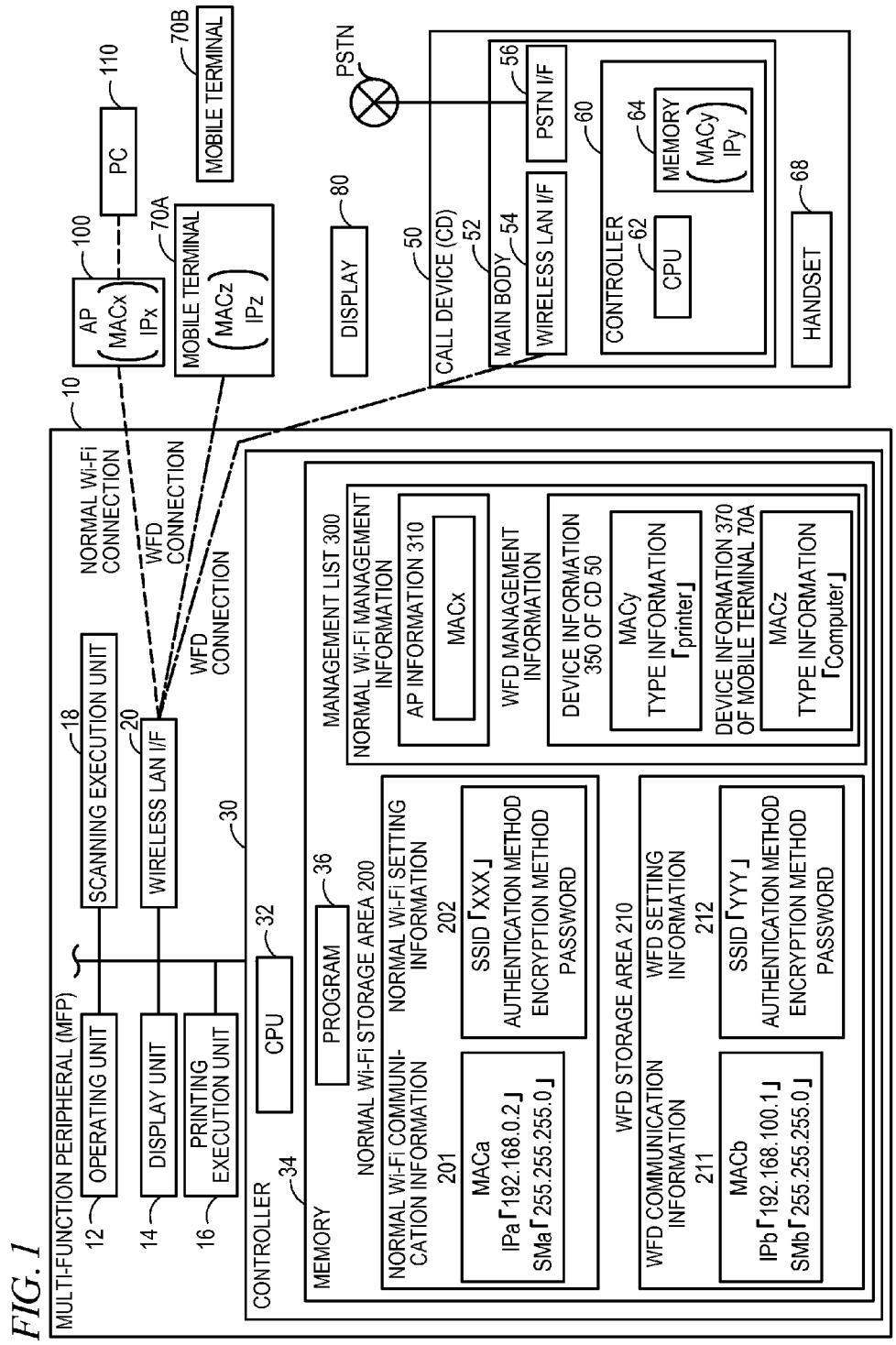
FIG. 1 shows the configuration of a communication system.

DETAILED DESCRIPTION (Configuration of System: FIG. 1)

As shown in FIG. 1, a system of this illustrative embodiment includes a multi-function peripheral (MFP) 10 and a call device (CD) 50. The MFP 10 and the CD 50 are shipped (that is, sold) in a set, and are installed, for example, at home. After a system in which the MFP 10 and the CD 50 can perform communication with each other is constructed, for example, respective devices, such as an access point (AP) 100, mobile terminals 70A and 70B, and a display 80, can be connected to the multi-function peripheral 10. A personal computer (PC) 110 can be connected to the AP 100.

(Configuration of MFP 10)

The MFP 10 is peripheral apparatus (that is, a peripheral of the PC 110) which can execute multiple functions including a printing function and a scanning function. The MFP 10 includes an operating unit 12, a display unit 14, a printing execution unit 16, a scanning execution unit 18, a wireless Local Area Network (LAN) interface (I/F) 20, and a controller 30. The respective units 12 to 30 are connected to a bus line (reference numeral is omitted).

The operating unit 12 includes a plurality of keys. A user can operate the operating unit 12 to input various instructions to the MFP 10. The display unit 14 is a display configured to display various kinds of information. The printing execution unit 16 has an ink jet type or laser type printing mechanism. The scanning execution unit 18 has a scanning mechanism, such as CCD or CIS.

The wireless LAN I/F 20 is an interface configured to execute wireless communication, and is physically a single interface (that is, a single IC chip). However, the wireless LAN I/F 20 is allocated with two MAC addresses of a MAC address (hereinafter, referred to as "MACa") for use in normal Wi-Fi communication according to a normal Wi-Fi system and a MAC address (hereinafter, referred to as "MACb") for use in WFD communication according to a Wi-Fi Direct (WFD) system. Accordingly, the controller 30 can execute normal Wi-Fi communication using MACa and WFD communication using MACb simultaneously.

The controller 30 includes a CPU 32 and a memory 34. The CPU 32 is a processor configured to execute various kinds of processing according to a program 36 stored in the memory 34. The memory 34 has a volatile area, a nonvolatile area, and the like, and can store various kinds of information 201, 202, 211, 212, and 300 as well as the program 36.

Normal Wi-Fi communication information 201 is information of the MFP 10 for executing normal Wi-Fi communication, and includes MACa, an IP address (hereinafter, referred to as "IPa"), and a subnet mask (hereinafter, referred to as "SMa"). The normal Wi-Fi setting information 202 is wireless setting information which is used in a wireless network for executing normal Wi-Fi communication, and includes a Service Set Identifier (SSID), an authentication method, an encryption method, and a password. Those information 201 and 202 are stored in a normal Wi-Fi storage area 200 which is provided in the volatile area of the memory 34.

The WFD communication information 211 is information of the MFP 10 for executing WFD communication, and includes MACb, an IP address (hereinafter, referred to as "IPb"), and a subnet mask (hereinafter, referred to as "SMb"). The WFD setting information 212 is wireless setting information which is used in a wireless network for executing WFD communication, and includes an SSID, an authentication method, an encryption method, and a password. Those information 211 and 212 are stored in a WFD storage area 210 which is provided in the volatile area of the memory 34.

A management list 300 is a list including information of each device, for which a wireless connection with the MFP 10 is established. When a wireless connection is established between the MFP 10 and the AP 100, AP information 310 relating to the AP 100 is described in the management list 300 as normal Wi-Fi management information. When a wireless connection is established between the MFP 10 and WFD system device, device information 350 and 370 relating to the client device are described in the management list 300 as WFD management information.

(WFD System and Normal Wi-Fi System)

Subsequently, the WFD system and the normal Wi-Fi system will be described in detail. As described above, in terms of a MAC address, WFD communication and the WFD system are respectively wireless communication and a wireless communication system in which MACb is used. Normal Wi-Fi communication and the normal Wi-Fi system are respectively wireless communication and a wireless communication system in which MACa is used.

(WFD System)

The WFD system is a wireless communication system which is described in the written standard "Wi-Fi Peer-to-Peer (P2P) Technical Specification Version 1.1" prepared by the Wi-Fi Alliance. The WFD system is, for example, a wireless communication system which is configured to execute wireless communication according to the 802.11 standard of IEEE (The Institute of Electrical and Electronics Engineers, Inc.) and an equivalent standard (for example, 802.11a, 11b, 11g, 11n, or the like).

Hereinafter, like the MFP 10, a device which can execute WFD communication according to the WFD system is referred to as "WFD device". In the written standard of WFD, as the state of a WFD device, a group owner state (hereinafter, referred to as "G/O state"), a client state (hereinafter, referred to as "CL state"), and a device state are defined. A WFD device is selectively operable in one state among the three states.

When a pair of WFD devices in a device state should newly form a wireless network, it is determined that one of the pair of WFD devices becomes a G/O state (that is, G/O device) and the other WFD device becomes a CL state (that is, CL device). Thereafter, the pair of WFD devices establishes a WFD connection and forms a wireless network.

Hereinafter, a wireless network which is formed according to the procedure of the WFD system is referred to as "WFDNW". In a stage where the WFDNW is newly formed between a pair of WFD devices, only one G/O device and one CL device belong to the WFDNW. However, the G/O device can establish WFD connections with other devices and can allow other devices to newly participate in the WFDNW as a CL device. In this case, two or more CL devices belong to the WFDNW. That is, in the WFDNW, there can be one G/O device and one or more CL devices. The G/O device manages one or more CL devices. Specifically, the G/O device registers the MAC address of the CL device in the management list of the memory of the G/O device. If a CL device is disconnected from the WFDNW, the G/O device deletes the MAC address of the CL device from the management list. If the number of CL devices becomes zero (that is, if the number of MAC addresses registered in the management list becomes zero), normally, the G/O device is transited from the G/O state to the device state, and terminates the WFDNW.

The number of CL devices which can be managed by the G/O device is limited. In this illustrative embodiment, an upper limit number of devices with which the MFP 10 can establish wireless connections simultaneously is "3". Accordingly, when the MFP 10 operates as a G/O device and the MFP 10 does not establish a wireless connection with the AP 100, the MFP 10 can establish WFD connections with a maximum of three CL devices (that is, can manage a maximum of three CL devices). When the MFP 10 operates as a G/O device and the MFP 10 already establishes the wireless connection with the AP 100, the MFP 10 can establish WFD connections with a maximum of two CL devices (that is, can manage a maximum of two CL devices).

The G/O device can execute wireless communication of target data with the CL device registered in the management list without passing through other devices. Target data is data including information of a network layer of an OSI reference model and information of a higher layer (for example, an application layer) than the network layer, and for example, includes print data, scan data, and the like. The G/O device can relay wireless communication of target data between a pair of CL devices. In other words, a pair of CL devices can execute wireless communication of the target data through the G/O device.

As described above, in the WFDNW, wireless communication of target data can be executed between a WFD device as a transmission source of the target data and a WFD device as a transmission destination of the target data without passing through an AP (for example, the AP 100) provided separately from the WFD device. That is, WFD communication and the WFD system are respectively wireless communication without passing through an AP and a wireless communication system in which an AP is not used.

The difference between a G/O device and an AP (for example, the AP 100) of WFD is as follows. That is, when the G/O device of WFD is disconnected from the WFDNW to which the device belongs and newly belongs to another WFDNW, the G/O device can operate in a state (that is, the CL state) different from the G/O state. In contrast, the AP can only execute the same operation as the G/O state of WFD (for example, relay wireless communication) and cannot execute the same operation as the CL state of WFD.

The G/O device cannot execute wireless communication of target data with a WFD device in a device state (that is, a device), but can execute wireless communication of data for connection of the WFD system with the device. That is, the G/O device executes wireless communication of data for connection of the WFD system with the device and establishes a WFD connection with the device to allow the device to participate in the WFDNW. In other words, the device executes wireless communication of data for connection of the WFD system with the G/O device and establishes a WFD connection with the G/O device to participate in the WFDNW. In this case, the device is transited from the device state to the CL state. Data for connection of the WFD system is data (that is, data including no information of the network layer) including information of a lower layer (for example, a physical layer and a data link layer) than the network layer of the OSI reference model, and for example, includes a Probe Request signal, a Probe Response signal, a Provision Discovery Request signal, a Provision Discovery Response signal, WSC Exchange, 4-Way Handshake, and the like.

The Probe Request signal is a signal for requesting the establishment of a wireless connection. The Probe Response signal is a signal for responding to the Probe Request signal. The Provision Discovery Request signal is a signal for supplying information relating to a device as the transmission source of the signal. The Provision Discovery Response signal is a signal for responding to the Provision Discovery Request signal. Communication of WSC Exchange is executed to supply a password to be used in a wireless network. Communication of 4-Way Handshake is executed for authentication.

The G/O device also executes wireless communication of data for connection of the normal Wi-Fi system with a normal Wi-Fi device and establishes a normal Wi-Fi connection with the normal Wi-Fi device to allow the normal Wi-Fi device to participate in the WFDNW. The normal Wi-Fi device is a device which cannot participate in the wireless network according to the WFD system but can participate in the wireless network according to the normal Wi-Fi system. The normal Wi-Fi device is also referred to as "legacy device". Data for connection of the normal Wi-Fi system is the same as data for connection of the WFD system, but does not include the Provision Discovery Request signal and the Provision Discovery Response signal. When the normal Wi-Fi connection with the normal Wi-Fi device is established, the G/O device describes the MAC address of the normal Wi-Fi device in the management list. Accordingly, the normal Wi-Fi device can participate in the WFDNW. The normal Wi-Fi device does not selectively operate in one state of the three states (that is, the G/O state, the CL state, and the device state), but operates in the same state as the CL device while belonging to the WFDNW.

(Normal Wi-Fi System)

The normal Wi-Fi system is a wireless communication system defined by the Wi-Fi Alliance, and is a wireless communication system different from the WFD system. The normal Wi-Fi system is a wireless communication system which is configured to execute wireless communication according to the 802.11 standard of IEEE and an equivalent standard (for example, 802.11a, 11b, 11g, 11n, or the like), like the WFD system. That is, in terms of a communication standard, the WFD system and the normal Wi-Fi system are the same.

However, as described above, while the WFD system is a system which is configured to execute wireless communication without passing through an AP, the normal Wi-Fi system is a system which is configured to execute wireless communication through an AP. As described above, while data for connection of the WFD system includes the Provision Discovery Request signal and the Provision Discovery Response signal, data for connection of the normal Wi-Fi system does not include these signals. While the WFD system is a wireless communication system which permits selective operation in one state of the three states (that is, the G/O state, the CL state, and the device state), the normal Wi-Fi system is a wireless communication system which does not permit the selective operation. In terms of these points, the WFD system and the normal Wi-Fi system are different.

The normal Wi-Fi device executes wireless communication of data for connection of the normal Wi-Fi system with the AP (for example, the AP 100) to establish a normal Wi-Fi connection with the AP. Accordingly, the normal Wi-Fi device can participate in a wireless network (hereinafter, referred to as "normal Wi-FiNW") which is formed by the AP. The normal Wi-Fi device can execute wireless communication of target data with other devices belonging to the normal Wi-FiNW through the AP. When the normal Wi-Fi connection with the normal Wi-Fi device is established, the AP describes the MAC address of the normal Wi-Fi device in the management list of the AP.

(Configuration of CD 50)

The CD 50 includes a main body 52 and a handset 68. The handset 68 is detachably provided with respect to the main body 52.

The main body 52 includes a wireless LAN I/F 54, a Public Switched Telephone Network (PSTN) I/F 56, and a controller 60. The wireless LAN I/F 54 is an I/F which is configured to execute wireless communication. The PSTN I/F 56 is connected to a PSTN which is a general public network.

The controller 60 includes a CPU 62 and a memory 64. The CPU 62 is a processor which executes various kinds of processing according to a program (not shown) stored in the memory 64. The memory 64 has a volatile area, a nonvolatile area, and the like, and can store various kinds of information as well as the program.

Though not shown, each of the main body 52 and the handset 68 includes an interface which is configured to execute wireless communication of sound data according to the standard of Digital Enhanced Cordless Telecommunication (DECT). The main body 52 and the handset 68 execute wireless communication of sound data, whereby a telephone call with an external telephone (not shown) (that is, a telephone connected to the PSTN) is realized.

The CD 50 is a WFD device. Although details will be described below, if powered on, the MFP 10 operates as a G/O device to form WFDNW. If powered on, the CD 50 establishes a WFD connection with the MFP 10 and participates in the WFDNW formed by the MFP 10 as a CL device. Accordingly, the CD 50 can execute wireless communication of target data (for example, FAX data described below) with the MFP 10 using the WFDNW.

(FAX Function)

The MFP 10 and the CD 50 execute processing in corporation, whereby a FAX function is realized. For example, when FAX data is received from an external FAX device (not shown) through the PSTN I/F 56, the CPU 62 of the CD 50 transmits FAX data to the MFP 10 using the WFDNW (that is, through the wireless LAN I/F 54). When FAX data is received from the CD 50 using the WFDNW (that is, through the wireless LAN I/F 20), the CPU 32 of the MFP 10 causes the printing execution unit 16 to print an image represented by FAX data. Accordingly, a FAX reception operation is realized.

For example, when the external FAX device is designated as the transmission destination of FAX data by the user, the CPU 32 of the MFP 10 transmits FAX data, which is obtained by causing the scanning execution unit 18 to scan a document, to the CD 50 using the WFDNW (that is, through the wireless LAN I/F 20). If FAX data is received from the MFP 10 using the WFDNW (that is, through the wireless LAN I/F 54), the CPU 62 of the CD 50 transmits FAX data to the external FAX device through the PSTN I/F 56. Accordingly, a FAX transmission operation is realized.

(Configuration of Mobile Terminals 70A and 70B)

Each of the mobile terminals 70A and 70B is a portable terminal device, such as a mobile phone (for example, a smartphone), a PDA, a notebook PC, a tablet PC, a mobile music reproduction device, or a mobile motion image reproduction device. An application program (hereinafter, referred to as "printing application") for causing the MFP 10 to execute a printing function is installed on each of the mobile terminals 70A and 70B. The printing application is provided by a vendor of the MFP 10, and may be installed on each of the mobile terminals 70A and 70B from a server on the Internet or may be installed on each of the mobile terminals 70A and 70B using a medium shipped along with the MFP 10.

Each of the mobile terminals 70A and 70B is a WFD device. Each of the mobile terminals 70A and 70B can establish a WFD connection with the MFP 10 to participate in the WFDNW as a CL device. Accordingly, each of the mobile terminals 70A and 70B can execute wireless communication of target data (for example, print data to be printed by the MFP 10) with the MFP 10 using the WFDNW.

(Configuration of Display 80)

The display 80 is, for example, a display of a television set at home. The printing application is not installed on the display 80. The display 80 is a WFD device. The display 80 can establish a WFD connection with the MFP 10 to participate in the WFDNW as a CL device. Accordingly, the display 80 can execute wireless communication of target data (for example, image data to be displayed on the display) with the MFP 10 using the WFDNW.

(Configuration of AP 100)

The AP 100 is a normal AP which is referred to as a wireless access point, a wireless LAN router, or the like, and is different from the G/O device of the WFD system. The AP 100 can form a wireless network (that is, normal Wi-FiNW) according to the normal Wi-Fi system.

(Configuration of PC 110)

The PC 110 can establish a normal Wi-Fi connection with the AP 100 to participate in the normal Wi-FiNW formed by the AP 100. The printing application for causing the MFP 10 to execute the printing function is also installed on the PC 110.

Figure 2:
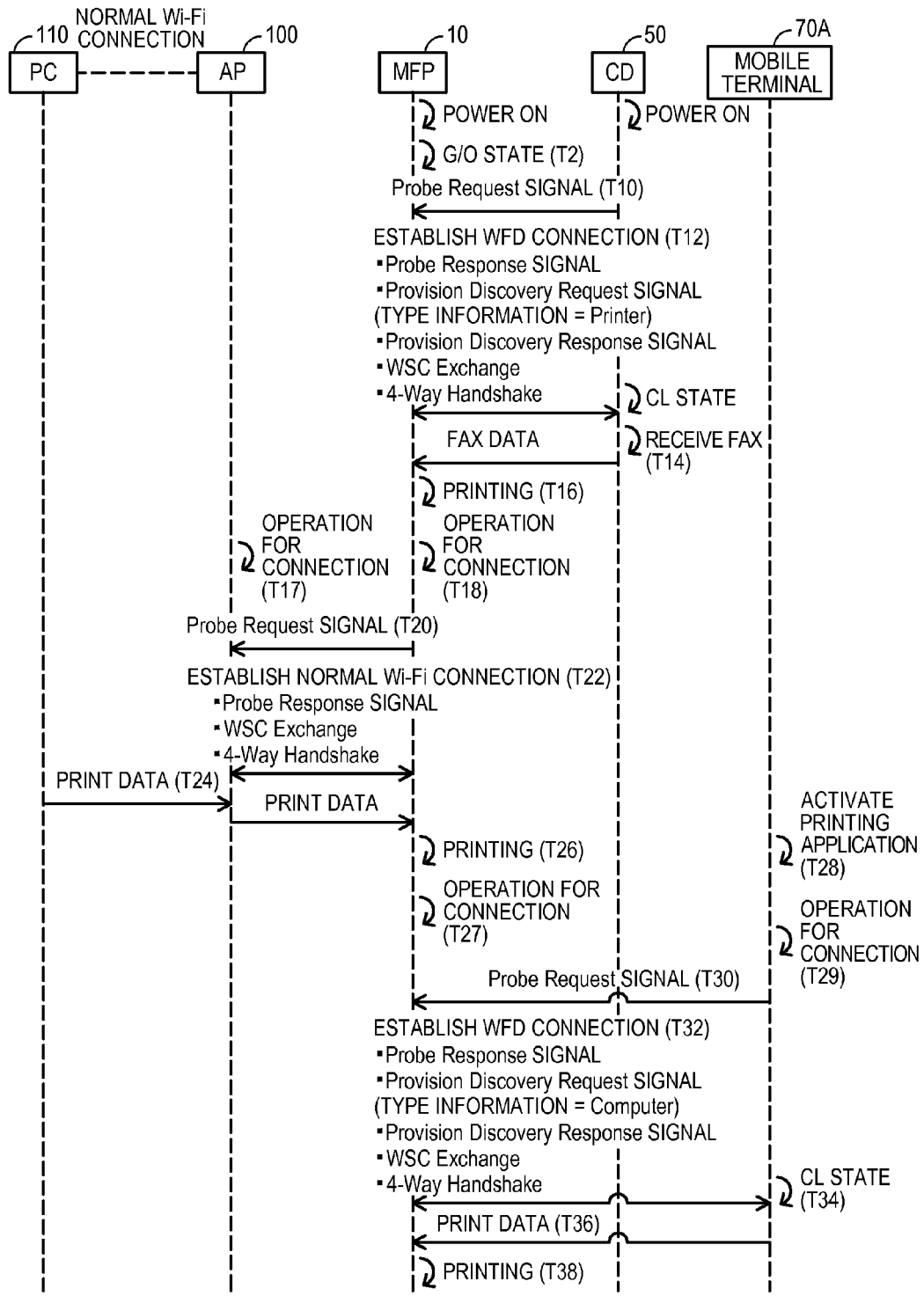
FIG. 2 is a sequence diagram of processing which is executed by each device.

(Preliminary Processing Which is Executed by Each Device: FIG. 2)

Subsequently, processing which is executed by each of devices 10, 50, 70A, 100, and 110 will be described referring to FIG. 2. In an initial state of FIG. 2, a normal Wi-Fi connection is established between the AP 100 and the PC 110, the MFP 10 and the CD 50 are powered off, and a wireless connection is not established for the mobile terminal 70A. First, the outline of each processing of FIG. 2 will be described.

If the MFP 10 is powered on, in T2, the CPU 32 of the MFP 10 forms the WFDNW. If the CD 50 is powered on, in T10 and T12, the CPU 62 of the CD 50 establishes a WFD connection with the MFP 10 to allow the CD 50 to participate in the WFDNW.

Since the MFP 10 and the CD 50 belong to the same WFDNW, in T14 and T16, the MFP 10 and the CD 50 can execute the FAX reception operation described below. That is, in T14, when FAX data is received from the PSTN, the CPU 62 of the CD 50 transmits FAX data to the MFP 10 through the wireless LAN I/F 54 using the WFDNW (that is, directly without passing through the AP 100). In T16, when FAX data is received from the CD 50 through the wireless LAN I/F 20 using the WFDNW, the CPU 32 of the MFP 10 causes the printing execution unit 16 to print an image represented by FAX data. Hereinafter, for various kinds of communication (that is, communication other than communication through the PSTN) executed by the MFP 10 or CD 50, the description "through the wireless LAN I/F 20 (or 54)" will be omitted.

Next, in T17 and T18, an operation to establish a normal Wi-Fi connection between the AP 100 and the MFP 10 is executed in each of the AP 100 and the MFP 10. In this case, in T20 and T22, the MFP 10 establishes the normal Wi-Fi connection with the AP 100 to participate in the normal Wi-FiNW formed by the AP 100.

Since both the MFP 10 and the PC 110 belong to the same normal Wi-FiNW formed by the AP 100, the MFP 10 and the PC 110 can execute communication described below. That is, in T24, the PC 110 generates print data representing an image to be printed by the MFP 10 using the printing application and transmits print data to the MFP 10 using the normal Wi-FiNW (that is, indirectly through the AP 100).

When print data is received from the PC 110 through the AP 100 using the normal Wi-FiNW, in T26, the CPU 32 of the MFP 10 causes the printing execution unit 16 to print the image represented by print data.

Next, in T27, T28, and T29, an operation to establish a WFD connection between the MFP 10 and the mobile terminal 70A is executed in each of the MFP 10 and the mobile terminal 70A. In this case, in T30, T32, and T34, the mobile terminal 70A establishes the WFD connection with the MFP 10 to participate in the WFDNW as a CL device.

Since the MFP 10 and the mobile terminal 70A belong to the same WFDNW, in T36, the mobile terminal 70A generates print data representing an image to be printed by the MFP 10 using the printing application and transmits print data to the MFP 10 using the WFDNW (that is, directly without passing through the AP 100).

When print data is received from the mobile terminal 70A using the WFDNW, in T38, the CPU 32 of the MFP 10 causes the printing execution unit 16 to print the image represented by print data.

Subsequently, the details of each processing of FIG. 2 will be described. If the MFP 10 is powered on, the CPU 32 of the MFP 10 executes each processing described below.

In T2, the CPU 32 of the MFP 10 transits the state of the MFP 10 to the G/O state of the WFD system. That is, the MFP 10 is voluntarily transited to the G/O state. Accordingly, a WFDNW to which only the MFP 10 belongs is formed.

The CPU 32 of the MFP 10 determines the IPb "192.168.100.1" and the SMb "255.255.255.0" of the MFP 10 to be used in the WFDNW according to a prescribed rule. The CPU 32 stores the IPb and the SMb as WFD communication information 211 in a WFD storage area 210 (see FIG. 1).

The CPU 32 of the MFP 10 reads an SSID "YYY", an authentication method, and an encryption method stored in the nonvolatile area of the memory 34 in advance and generates a password according to a prescribed rule. The CPU 32 stores the SSID "YYY", the authentication method, the encryption method, and the password as WFD setting information 212 in the WFD storage area 210 (see FIG. 1).

Though not shown, the memory 64 of the CD 50 stores the same information as the SSID "YYY", the authentication method, and the encryption method stored in the memory 34 of the MFP 10 in advance from the shipment stage of the CD 50 (that is, the shipment stage of the MFP 10). If the CD 50 is powered on by the user, the CPU 62 of the CD 50 reads the SSID "YYY" from the memory 64 of the CD 50.

In T10, the CPU 62 of the CD 50 transmits a connection request (that is, a Probe Request signal) including the read SSID "YYY" and the MAC address (hereinafter, referred to as "MACy") of the CD 50 to the MFP 10.

If the Probe Request signal is received from the CD 50, the CPU 32 of the MFP 10 recognizes that the SSID "YYY" included in the Probe Request signal matches the SSID "YYY" used in the WFDNW.

In this case, in T12, the CPU 32 of the MFP 10 executes wireless communication (however, excluding communication of the Probe Request signal) of data for connection of the WFD system with the CD 50 to establish the WFD connection with the CD 50.

Specifically, in T12, the CPU 32 of the MFP 10 transmits the Probe Response signal to the CD 50 and then receives a Provision Discovery Request signal from the CD 50. The Provision Discovery Request signal includes type information representing the device type of the CD 50. As described above, since the CD 50 is sold in a set along with the MFP 10, the type information of the CD 50 is the same as the type information of the MFP 10, and represents "Printers, Scanners, Faxes and Copiers". Hereinafter, the type information is referred to as "Printer". Next, the CPU 32 transmits a Provision Discovery Response signal to the CD 50. The CPU 32 executes communication of WSC Exchange and 4-Way Handshake with the CD 50. In the process of T12, the CPU 32 supplies the password included in the WFD setting information 212 of the WFD storage area 210 to the CD 50.

During the process in which the WFD connection is established (that is, in the process of T12), the CPU 62 of the CD 50 transits the state of the CD 50 from the device state to the CL state. Accordingly, the CD 50 can participate in the WFDNW as a CL device.

The CPU 32 of the MFP 10 describes device information 350 (see FIG. 1) of the CD 50 in a management list 300. The device information 350 includes the MACy of the CD 50 included in the connection request (that is, the Probe Request signal) received in T10 and the type information "Printer" of the CD 50 included in the Provision Discovery Request signal received in T12.

If the WFD connection with the CD 50 is established (that is, after T12), the CPU 32 of the MFP 10 specifies network address "192.168.100" of the WFDNW using the IPb and the SMb of the MFP 10. The CPU 32 generates an IP address (hereinafter, referred to as "IPy"; for example, "192.168.100.2") which is an IP address having the network address "192.168.100" and is different from the IPb. The CPU 32 allocates the generated IPy and the SMb used in the WFDNW to the CD 50.

In T14 and T16, the CPU 32 of the MFP 10 can receive FAX data from the CD 50 using the WFDNW and can cause the printing execution unit 16 to execute printing.

In T17 and T18, in order to establish a normal Wi-Fi connection between the MFP 10 and the AP 100, the user executes an operation according to a so-called automatic wireless setup push-button configuration method (that is, a PBC method) in each of the MFP 10 and the AP 100. Automatic wireless setup is, for example, Wi-Fi Protected Setup (WPS).

If the operation of T18 is executed, in T20, the CPU 32 of the MFP 10 reads the MACa of the MFP 10 stored in advance and transmits the connection request (that is, the Probe Request signal) including the MACa to the AP 100.

Next, in T22, the CPU 32 of the MFP 10 executes wireless communication (except for communication of the Probe Request signal) of data for connection of the normal Wi-Fi system with the AP 100 to establish a normal Wi-Fi connection with the AP 100. Specifically, the CPU 32 receives the Probe Response signal including the MAC address (hereinafter, referred to as "MACx") of the AP 100 from the AP 100 and then sequentially executes communication of WSC Exchange and 4-Way Handshake with the AP 100. The CPU 32 does not execute communication of the Provision Discovery Request signal and the Provision Discovery Response signal with the AP 100.

In the process of T22, the CPU 32 of the MFP 10 acquires the normal Wi-Fi setting information 202 (that is, an SSID "XXX", an authentication method, an encryption method, and a password) currently used in the normal Wi-FiNW from the AP 100. The CPU 32 stores the normal Wi-Fi setting information 202 in the normal Wi-Fi storage area 200 (see FIG. 1).

In this illustrative embodiment, the AP 100 functions as a Dynamic Host Configuration Protocol (DHCP) server. Accordingly, if the normal Wi-Fi connection with the AP 100 is established (that is, after T22), the CPU 32 of the MFP 10 acquires the IPa "192.168.0.2" and the SMa "255.255.255.0" of the MFP 10 to be used in the normal Wi-FiNW from the AP 100. The CPU 32 stores these information as normal Wi-Fi communication information 201 in the normal Wi-Fi storage area 200 (see FIG. 1).

The CPU 32 of the MFP 10 describes AP information 310 (see FIG. 1) including the MACx of the AP 100 included in the Probe Response signal received in T22 in the management list 300.

In T24 and T26, the CPU 32 of the MFP 10 can receive print data from the PC 110 through the AP 100 using the normal Wi-FiNW and can cause the printing execution unit 16 to execute printing.

As described above, the mobile terminal 70A has a printing application for causing the MFP 10 to execute a printing function. In T27, when desiring to cause the MFP 10 to execute the printing function, the user of the mobile terminal 70A performs an operation according to the push-button configuration method in the MFP 10. In T28, the user activates the printing application. Next, in T29, the user performs the operation according to the push-button configuration method in the mobile terminal 70.

If the operations of T28 and T29 are performed, in T30, the mobile terminal 70A transmits a Probe Request signal including the MAC address (hereinafter, referred to as "MACz") of the mobile terminal 70 to the MFP 10.

If the Probe Request signal including the MACz is received from the mobile terminal 70A, in T32, the CPU 32 of the MFP 10 executes wireless communication (however, excluding communication of the Probe Request signal) of data for connection of the WFD system with the mobile terminal 70A to establish the WFD connection with the mobile terminal 70A.

Specifically, in T32, the CPU 32 of the MFP 10 transmits the Probe Response signal to the mobile terminal 70A and then receives a Provision Discovery Request signal from the mobile terminal 70A. The Provision Discovery Request signal includes type information "Computer" of the mobile terminal 70A. Next, the CPU 32 transmits the Provision Discovery Response signal to the mobile terminal 70A and executes communication of WSC Exchange and 4-Way Handshake with the mobile terminal 70A. In the process of T32, the CPU 32 supplies the SSID "YYY", the authentication method, the encryption method, and the password included in the WFD setting information 212 of the WFD storage area 210 to the mobile terminal 70A.

If the WFD connection with the mobile terminal 70A is established (that is, after T32), the CPU 32 of the MFP 10 generates an IP address (hereinafter, referred to as "IPz"; for example, "192.168.100.3") which is an IP address having the same network address as the network address "192.168.100" of the WFDNW and is different from the IPb and the IPy of the MFP 10 and the CD 50. The CPU 32 allocates the generated IPz and the SMb used in the WFDNW to the mobile terminal 70A.

The CPU 32 of the MFP 10 describes device information 370 (see FIG. 1) of the mobile terminal 70A in the management list 300. The device information 370 includes the MACz included in the connection request (that is, the Probe Request signal) received in T30 and the type information "Computer" of the mobile terminal 70A included in the Provision Discovery Request signal received in T32.

In T34, the mobile terminal 70A transits the state of the mobile terminal 70A from the device state to the CL state. Accordingly, the mobile terminal 70A can participate in the WFDNW as a CL device.

In T36 and T38, the CPU 32 of the MFP 10 can receive print data from the mobile terminal 70A using the WFDNW and can cause the printing execution unit 16 to execute printing.

As described above, if T12 is executed, the MFP 10 becomes a state where the WFD connection with the CD 50, that is, the single wireless connection is established. That is, the upper limit number of wireless connections (that is, three wireless connections) are not established in the MFP 10. Accordingly, the MFP 10 can establish wireless connections with the remaining two devices. Therefore, in T22, the MFP 10 can further establish a normal Wi-Fi connection with the AP 100.

If T22 is executed, the MFP 10 becomes a state where two wireless connections of the WFD connection with the CD 50 and the normal Wi-Fi connection with the AP 100 are established. That is, the upper limit number of wireless connections (that is, three wireless connections) are not established in the MFP 10. Accordingly, the MFP 10 can establish a wireless connection with the remaining one device. Therefore, in T32, the MFP 10 can establish a WFD connection with the mobile terminal 70A.

If T32 is executed, the MFP 10 becomes a state where the WFD connection with the CD 50, the normal Wi-Fi connection with the AP 100, and the WFD connection with the mobile terminal 70A are established. That is, the upper limit number of wireless connections (that is, three wireless connections) are established in the MFP 10.

In the example of FIG. 2, although the normal Wi-Fi connection is established between the MFP 10 and the AP 100, the normal Wi-Fi connection may not be established. In this case, in a situation where the WFD connection with the CD 50 and the WFD connection with the mobile terminal 70A are established, the MFP 10 can further establish a WFD connection with another device.

For example, if the connection request is received from the mobile terminal 70B, as in the mobile terminal 70A, the MFP 10 establishes a WFD connection with the mobile terminal 70B. Accordingly, the MFP 10 can receive print data from the mobile terminal 70B using the WFDNW and can execute the printing function.

Further, for example, if the connection request is received from the display 80, the MFP 10 establishes a WFD connection with the display 80. In the process of establishing the WFD connection with the display 80, the MFP 10 receives the Provision Discovery Request signal including the type information "Display" of the display 80 from the display 80. If the WFD connection with the display 80 is established, for example, the MFP 10 can transmit scan data to the display 80 using the WFDNW and can cause the display 80 to display a scan image.

The printing application may be installed on a digital camera not shown in FIG. 1. In this case, the MFP 10 may receive a connection request from the digital camera. If the connection request is received from the digital camera, the MFP 10 establishes a WFD connection with the digital camera. In the process of establishing the WFD connection with the digital camera, the MFP 10 receives a Provision Discovery Request signal including type information "Camera" of the digital camera from the digital camera. If the WFD connection with the digital camera is established, the MFP 10 may receive print data from the digital camera using the WFDNW and may execute a printing function.

As described above, in this illustrative embodiment, the MFP 10 can establish a WFD connection with a device having various kinds of type information "Printer" and the like. Normally, the printing application is not installed on a device (for example, the CD 50) having type information "Printer" and a device (for example, the display 80) having type information "Display". On the other hand, the printing application can be installed on a device (for example, the mobile terminals 70A and 70B) having type information "Computer" and a device (for example, the digital camera) having type information "Camera". Hereinafter, a device of a type on which the printing application is not installed and a device of a type on which the printing application can be installed are respectively referred to as "specific type device" and "non-specific type device", respectively.

Figure 3:
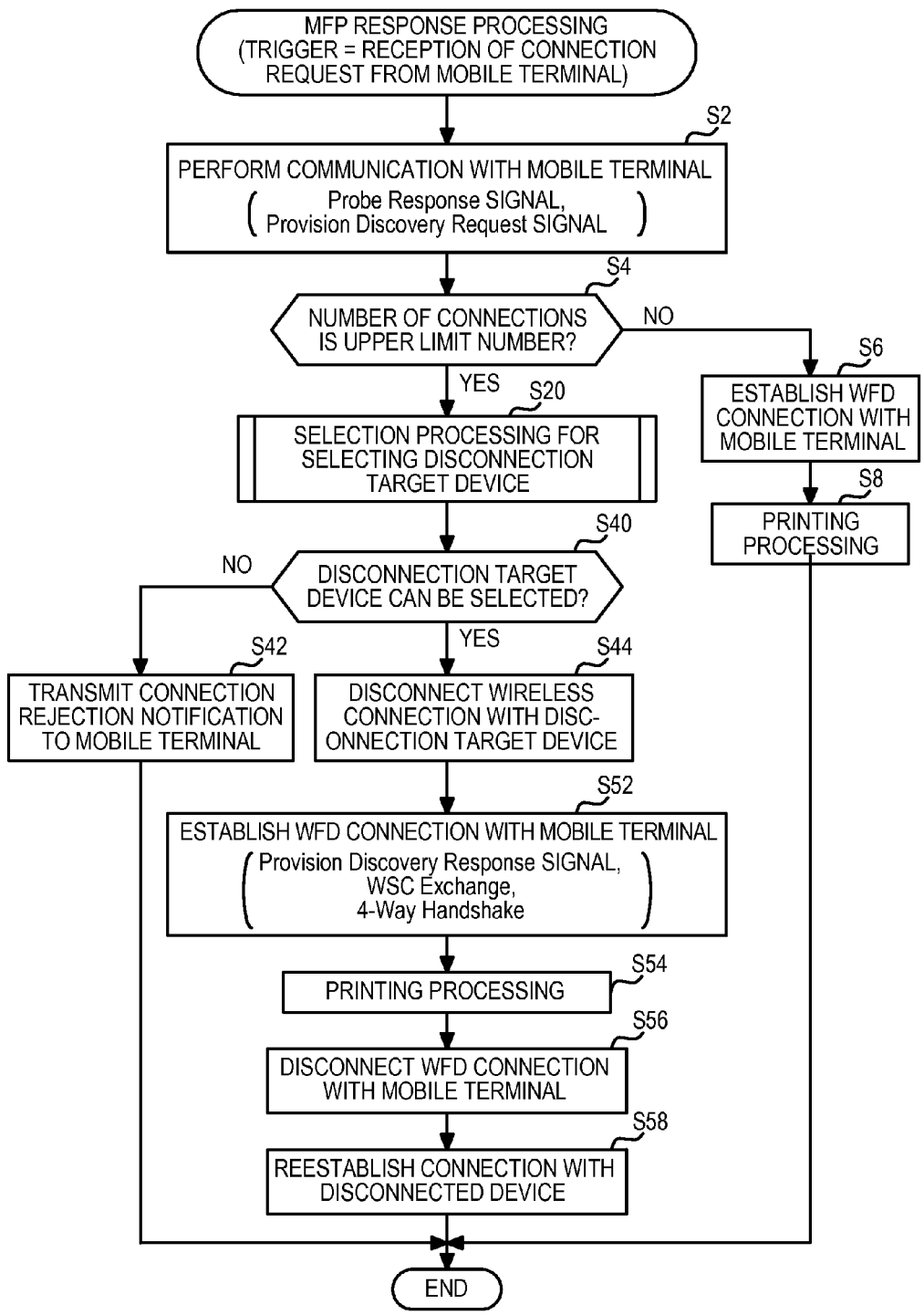
FIG. 3 is a flowchart of response processing of an MFP.

(Response Processing of MFP 10: FIG. 3)

The details of response processing which is executed by the CPU 32 of the MFP 10 will be described referring to FIG. 3. The response processing of FIG. 3 starts with the reception of a connection request from a specific mobile terminal (for example, the mobile terminal 70A or 70B) (for example, T30 of FIG. 2) as a trigger. The connection request (that is, the Probe Request signal) includes the MAC address of the specific mobile terminal.

In S2, the CPU 32 transmits the Probe Response signal to the specific mobile terminal and then receives a Provision Discovery Request signal including type information from the specific mobile terminal (for example, T32 of FIG. 2). The type information of the specific mobile terminal is "Computer".

In S4, the CPU 32 determines whether the number of wireless connections (hereinafter, referred to as "number of connections") currently established in the MFP 10 is equal to the upper limit number (that is, "3"). When the number of connections is "1" or "2", the CPU 32 determines that the number of connections is not equal to the upper limit number (that is, NO in S4) and proceeds to S6. For example, in T30 of FIG. 2, when the MFP 10 receives the connection request from the mobile terminal 70A (that is, the specific mobile terminal), the number of connections is "2".

In S6, the CPU 32 establishes a WFD connection with the specific mobile terminal (for example, the mobile terminal 70A) while maintaining the other established wireless connections (for example, in the example of FIG. 2, the WFD connection with the CD 50 and the normal Wi-Fi connection with the AP 100). Each processing for establishing the WFD connection is the same as each processing of T32 of FIG. 2, respectively.

Next, in S8, the CPU 32 receives a printing instruction (that is, print data) from the specific mobile terminal using the WFDNW and supplies print data to the printing execution unit 16. Accordingly, an image represented by print data is printed by the printing execution unit 16. If S8 ends, the processing of FIG. 3 ends in a state where the WFD connection between the MFP 10 and the specific mobile terminal is maintained.

On the other hand, for example, in FIG. 2, when a connection request is further received from the mobile terminal 70B (that is, the specific mobile terminal) after the WFD connection is established between the MFP 10 and the mobile terminal 70A, the CPU 32 determines that the number of connections is equal to the upper limit number (that is, YES in S4) and proceeds to S20.

In the example of FIG. 2, a normal Wi-Fi connection is established between the MFP 10 and the AP 100, and two WFD connections are established between the MFP 10 and two CL devices (that is, the CD 50 and the mobile terminal 70A). As a result, the number of connections is equal to the upper limit number. Incidentally, in a situation where the normal Wi-Fi connection is not established between the MFP 10 and the AP 100, and three WFD connections are established between the MFP 10 and three CL devices, the number of connections is also equal to the upper limit number. In this case, the CPU 32 determines that the number of connections is equal to the upper limit number (that is, YES in S4) and proceeds to S20.

In S20, the CPU 32 executes selection processing for selecting one device (hereinafter, referred to as "disconnection target device"), for which the wireless connection is to be temporarily disconnected, among three devices with which the wireless connection with the MFP 10 is currently established. In the selection processing, the CPU 32 broadcasts an inquiry signal to the wireless network to which the MFP 10 belongs and monitors the reception of an activation signal. The inquiry signal is a signal for inquiring whether each device as a final transmission destination of the inquiry signal is activating the printing application. The activation signal is a signal representing that the printing application is being activated (that is, in operation). The term "activating the printing application" means a state from when the printing application is activated until the printing application ends, that is, a state where the printing application is in operation. In S20, normally, the CPU 32 selects the disconnection target device (that is, the AP 100 or CL device) according to the reception result of the activation signal. However, in S20, the disconnection target device may not be selected.

Next, in S40, the CPU 32 determines whether the disconnection target device can be selected. When it is determined that the disconnection target device cannot be selected (NO in S40), in S42, the CPU 32 transmits a connection rejection notification to the specific mobile terminal. Accordingly, it is possible to give notification to the specific mobile terminal that the wireless connection (that is, the WFD connection) with the MFP 10 cannot be established. When S42 is executed, the wireless connection is not established between the MFP 10 and the specific mobile terminal, and the processing of FIG. 3 ends.

On the other hand, when it is determined that the disconnection target device can be selected (YES in S40), in S44, the CPU 32 disconnects the wireless connection with the disconnection target device. For example, when the AP 100 is selected as the disconnection target device, in S44, the CPU 32 transmits a leaving signal representing the leaving from the normal Wi-FiNW with the MACx of the AP 100 described in the management list 300 as the transmission destination. As a result, the normal Wi-Fi connection between the MFP 10 and the AP 100 is disconnected. Next, the CPU 32 deletes the AP information 310 from the management list 300. Accordingly, the number of MAC addresses in the management list 300 becomes two (that is, the number of connections of the MFP 10 is "2" less than the upper limit number).

For example, when a CL device is selected as the disconnection target device, in S44, the CPU 32 transmits the disconnection signal to the selected CL device.

As a result, the WFD connection between the MFP 10 and the selected CL device is disconnected. The CPU 32 deletes the device information of the selected CL device from the management list 300. Accordingly, the number of MAC addresses in the management list 300 becomes two (that is, the number of connections of the MFP 10 is "2" less than the upper limit number). Although the device information of the CL device is deleted from the management list 300, the device information of the CL device is stored in a save area different from the management list 300 of the memory 34. Accordingly, in S58 described below, the CPU 32 can read the MAC address from the save area and can transmit an Invite signal including the MAC address.

As described above, if S44 is executed, the number of connections of the MFP 10 becomes "2", and the MFP 10 becomes a state capable of establishing the wireless connection with the specific mobile terminal. Accordingly, in S52, the CPU 32 establishes a WFD connection with the specific mobile terminal. In the trigger and S2 of FIG. 3, communication of the Probe Request signal, the Probe Response signal, and the Provision Discovery Request signal is executed between the MFP 10 and the specific mobile terminal. Therefore, in S52, the CPU 32 executes communication subsequent to S2, that is, executes communication of the Provision Discovery Response signal, WSC Exchange, and 4-Way Handshake to the specific mobile terminal. Accordingly, the WFD connection is established between the MFP 10 and the specific mobile terminal. That is, the specific mobile terminal participates as a CL device in the WFDNW formed by the MFP 10 as the G/O device.

Next, in S54, the CPU 32 receives a printing instruction (that is, print data) from the specific mobile terminal using the WFDNW, and supplies print data to the printing execution unit 16. If all print data are received from the specific mobile terminal, the CPU 32 proceeds to S56.

In S56, the CPU 32 transmits the disconnection signal to the specific mobile terminal and disconnects the WFD connection with the specific mobile terminal. As a result, the number of connections of the MFP 10 becomes "2" less than the upper limit number.

Next, in S58, the CPU 32 reestablishes the wireless connection with the device (that is, the AP 100 or the CL device) for which the wireless connection is disconnected in S44. For example, when the normal Wi-Fi connection with the AP 100 is disconnected in S44, the CPU 32 reads the SSID "XXX" of the normal Wi-FiNW included in the normal Wi-Fi setting information 202 from the memory 34 and transmits a connection request including the SSID "XXX" to the AP 100. Each subsequent processing for establishing a normal Wi-Fi connection is the same as each processing of T22 of FIG. 2, respectively. However, an operation according to the automatic wireless setup push-button configuration method may not be executed in the AP 100. This is because the MFP 10 acquires the normal Wi-Fi setting information 202 used in the normal Wi-FiNW, and does not need to acquire the normal Wi-Fi setting information 202 from the AP 100. If the normal Wi-Fi connection is reestablished, the CPU 32 describes the AP information 310 in the management list 300 again.

For example, when the WFD connection with the CL device is disconnected in S44, the CL device is transited from the CL state to the device state. As a result of the processing of S44, the device which is transited to the device state is referred to as "specific device". The CPU 32 reads the MAC address included in the device information (for example, the device information 370) of the specific device from the save area of the memory 34 and transmits an Invite signal including the MAC address to the specific device. The Invite signal is a signal which is defined in the written standard of WFD, and is a signal which is provided to allow the device to participate in the WFDNW. If a WFD connection is reestablished, the CPU 32 describes the device information of the CL device, for which the WFD connection is reestablished, in the management list 300 again.

If the Invite signal including the MAC address of the specific device is received, the specific device transmits the connection request to the MFP 10. Each subsequent processing for establishing the WFD connection is the same as each processing of T32 of FIG. 2, respectively. However, an operation according to the automatic wireless setup push-button configuration method may not be executed in the MFP 10. When transmitting the Invite signal, even if an operation according to the push-button configuration method is not executed, the MFP 10 can supply the WFD setting information 212 to the specific device according to the automatic wireless setup.

As described above, if S58 is executed, the MFP 10 can reestablish the wireless connection with the device for which the wireless connection is disconnected. As a result, the state of the MFP 10 returns to the state before the processing of FIG. 3 starts, that is, the state where the number of connections is equal to the upper limit number.

Figure 4:
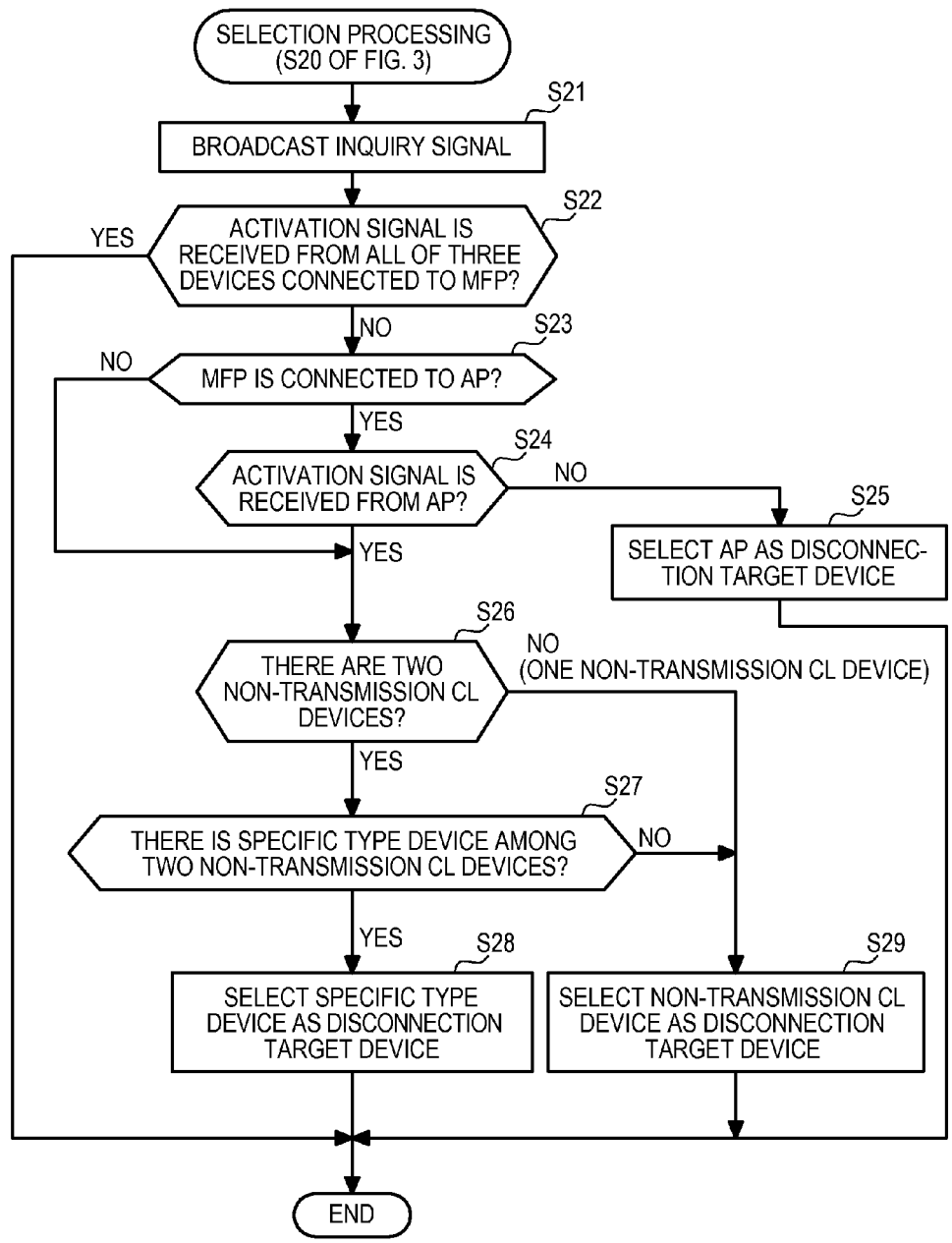
FIG. 4 is a flowchart of selection processing of an MFP.

(Selection Processing of MFP 10: FIG. 4)

FIG. 4 shows the details of selection processing of S20 of FIG. 3. In S21, the CPU 32 broadcasts the inquiry signal to all wireless networks to which the MFP 10 belongs and monitors the reception of the activation signal. For example, when a normal Wi-Fi connection is established between the MFP 10 and the AP 100 and two WFD connections are established between the MFP 10 and two CL devices (for example, the CD 50 and the mobile terminal 70A), the CPU 32 broadcasts the inquiry signal to each of the normal Wi-FiNW and the WFDNW. For example, when a normal Wi-Fi connection is not established between the MFP 10 and the AP 100 and the three WFD connections are established between the MFP 10 and three CL devices, the CPU 32 broadcasts the inquiry signal only to the WFDNW.

Among the respective devices which are the final transmission destination of the inquiry signal, a device on which the printing application is being activated transmits the activation signal representing the printing application being activated, to the MFP 10. For example, it is assumed that a WFD connection is established between the MFP 10 and the mobile terminal 70A and the printing application is being activated on the mobile terminal 70A. In this case, if the inquiry signal broadcasted to the WFDNW is received, the mobile terminal 70A transmits the activation signal to the MFP 10.

Meanwhile, as described above, the CD 50 has no printing application. However, when the inquiry signal broadcasted to the WFDNW is received from the MFP 10, the CD 50 transmits the activation signal to the MFP 10 even though no printing application is provided. Therefore, there is no case where the CD 50 is selected as a disconnection target device, and as a result, it is possible to suppress the occurrence of a situation where communication of FAX data between the MFP 10 and the CD 50 cannot be executed.

For example, it is assumed that a normal Wi-Fi connection is established between the MFP 10 and the AP 100 and the PC 110 connected to the AP 100 is activating the printing application. In this case, if the inquiry signal broadcasted to the normal Wi-FiNW is received, the PC 110 transmits the activation signal to the MFP 10 through the AP 100. Accordingly, the MFP 10 receives the activation signal from the PC 110 through the AP 100. That is, the MFP 10 receives the activation signal from the AP 100. When two or more devices other than the MFP 10 are connected to the AP 100, the printing application can be activated on each of the two or more devices. In this case, the MFP 10 can receive the activation signal from each of the two or more devices through the AP 100. That is, the MFP 10 can receive two or more activation signals from the AP 100.

In S22, the CPU 32 determines whether the activation signal is received from all of the three devices with which the wireless connection with the MFP 10 is established. For the three devices, the wireless connection with the MFP 10 is directly established without passing through other devices. The three devices are the AP 100 and two CL devices in one example and are three CL devices in another example. When the activation signal is received from all of the three devices until a predetermined time elapses after the inquiry signal is broadcasted, the CPU 32 determines to be YES in S22. In this case, the CPU 32 ends the processing of FIG. 4 without selecting the disconnection target device. As a result, it is determined to be NO in S40 of FIG. 3, all of the three wireless connections established by the MFP 10 are not disconnected, and in S42, a connection rejection notification is transmitted to the specific mobile terminal.

For example, if the MFP 10 cannot execute communication with the CD 50, a situation where FAX communication cannot be realized would occur. For example, if the MFP 10 cannot execute communication with a device which is activating the printing application, a situation where the MFP 10 cannot receive the printing instruction (that is, print data) from the device would occur. When the activation signal is received from all of the three devices for which the wireless connection with the MFP 10 is established (YES in S22), if one of the three wireless connections established by the MFP 10 is disconnected, any situation described above would occur. Therefore, in this illustrative embodiment, when the activation signal is received from all of the three devices for which the wireless connection with the MFP 10 is established (YES in S22), a configuration in which any wireless connection is not disconnected is employed. Accordingly, it is possible to suppress the occurrence of a situation where FAX communication cannot be realized or a situation where the MFP 10 cannot receive the printing instruction.

On the other hand, when the activation signal is not received from at least one device among the three devices for which the wireless connection with the MFP 10 is established until a predetermined time elapses after the inquiry signal is broadcasted, the CPU 32 determines to be NO in S22 and proceeds to S23. In S23, the CPU 32 determines whether a normal Wi-Fi connection is established between the MFP 10 and the AP 100. When the AP information 310 is described in the management list 300, the CPU 32 determines that the normal Wi-Fi connection is established (YES in S23) and proceeds to S24. On the other hand, when the AP information 310 is not described in the management list 300, the CPU 32 determines that the normal Wi-Fi connection is not established (NO in S23) and proceeds to S26.

In S24, the CPU 32 determines whether the activation signal is received from at least one device connected to the AP 100 through the AP 100. That is, the CPU 32 determines whether at least one activation signal is received from the AP 100. When at least one activation signal is received from the AP 100, the CPU 32 determines to be YES in S24 and proceeds to S26. When any activation signal is not received from the AP 100, the CPU 32 determines to be NO in S24 and proceeds to S25.

When any activation signal is not received from the AP 100 (NO in S24), any device (for example, the PC 110) connected to the AP 100 is not activating the printing application. Accordingly, there is a low possibility that the MFP 10 should receive the printing instruction from the devices connected to the AP 100 (that is, should execute communication through the AP 100). Therefore, in S25, the CPU 32 selects the AP 100 as the disconnection target device. If S25 ends, the processing of FIG. 4 ends, and in S44 of FIG. 3, the normal Wi-Fi connection with the AP 100 is disconnected.

On the other hand, when one or more activation signals are received from the AP 100 (YES in S24), any device (for example, the PC 110) connected to the AP 100 is activating the printing application. Accordingly, there is a high possibility that the MFP 10 should receive the printing instruction from the devices connected to the AP 100 (that is, should execute communication through the AP 100). Therefore, the CPU 32 does not select the AP 100 as the disconnection target device (that is, does not execute S25) and proceeds to S26.

In S26, the CPU 32 determines whether there are two non-transmission CL devices among the CL devices belonging to the WFDNW. A non-transmission CL device is a CL device which does not transmit the activation signal when receiving the inquiry signal broadcasted to the WFDNW. In a situation where three CL devices belong to the WFDNW, when the activation signal is received only from the CD 50 among the three CL devices, the CPU 32 determines that there are two non-transmission CL devices (YES in S26) and proceeds to S27. On the other hand, in a situation where three CL devices belong to the WFDNW, when the activation signal is received from two CL devices including the CD 50, the CPU 32 determines that there is only one non-transmission CL device (NO in S26) and proceeds to S29. In a situation where two CL devices belong to the WFDNW, when the activation signal is received only from the CD 50 between the two CL devices, the CPU 32 determines that there is only one non-transmission CL device (NO in S26) and proceeds to S29.

In S29, the CPU 32 selects the non-transmission CL device as the disconnection target device. In a situation where S29 is executed after it is determined to be NO in S26, since there is only one non-transmission CL device, the CPU 32 selects the one non-transmission CL device as the disconnection target device. If S29 ends, the processing of FIG. 4 ends, and in S44 of FIG. 3, the WFD connection with the non-transmission CL device is disconnected.

In S27, the CPU 32 determines whether there is a specific type device among two non-transmission CL devices. As described above, a specific type device is a device of a type on which the printing application is not installed. In a situation where S27 is executed, three device information are described in the management list 300. When at least one device information among two device information different from the device information 350 of the CD 50 includes type information representing "Printer" or "Display", the CPU 32 determines that there is a specific type device (YES in S27) and proceeds to S28. On the other hand, when two device information different from the device information 350 of the CD 50 include type information representing "Computer" or "Camera", the CPU 32 determines that there is no specific type device (NO in S27) and proceeds to S29.

In a situation where S29 is executed after it is determined to be NO in S27, there are two non-transmission CL devices. In this case, the CPU 32 selects one non-transmission CL device among the non-transmission CL devices as the disconnection target device. Here, a selection method is not particularly limited, and for example, the CPU 32 may select one non-transmission CL device randomly or may select one non-transmission CL device according to a predetermined rule.

In S28, the CPU 32 selects the specific type device as the disconnection target device. For example, when there are one non-specific type device and one specific type device among the two non-transmission CL devices, in S28, the CPU 32 selects the one specific type device as the disconnection target device. For example, when both the two non-transmission CL devices are a specific type device, in S28, the CPU 32 selects one specific type device among the specific type devices as the disconnection target device. A selection method is not particularly limited, and for example, the CPU 32 may select the disconnection target device randomly or according to a predetermined rule (for example, specific type device for which the wireless connection is established in an older order may be selected). If S28 ends, the processing of FIG. 4 ends, and in S44 of FIG. 3, the WFD connection with the specific type device is disconnected.

In the non-specific type device, since the printing application can be activated, there is a higher possibility that the MFP 10 should receive the printing instruction from the non-specific type device (that is, should execute communication with the non-specific type device). Meanwhile, in the specific type device, since the printing application is not activated, there is a lower possibility that communication should be performed between the MFP 10 and the specific type device. Accordingly, in this illustrative embodiment, in S28, the MFP 10 selects the specific type device as the disconnection target device.

A CL device on which the printing application is not being activated does not transmit the printing instruction to the MFP 10 unless the printing application is activated. Accordingly, the possibility that the MFP 10 should receive the printing instruction from the CL device on which the printing application is not being activated (that is, should execute communication with the CL device on which the printing application is not being activated) is lower than the possibility that the MFP 10 should receive the printing instruction from the CL device on which the printing application is being activated. Accordingly, in this illustrative embodiment, in S28 or S29, the MFP 10 does not select a CL device, on which the printing application is being activated, as the disconnection target device, and selects a CL device (that is, a non-transmission CL device), on which the printing application is not being activated, as the disconnection target device. Accordingly, the MFP 10 can select a CL device which is less likely to execute communication and can disconnect the WFD connection with the CL device.

In this illustrative embodiment, since the MFP 10 receives the activation signal from the CD 50 which has no printing application, the MFP 10 does not select the CD 50 as the disconnection target device. Therefore, the WFD connection between the MFP 10 and the CD 50 is not disconnected, and as a result, it is possible to suppress the occurrence of a situation where communication of FAX data between the MFP 10 and the CD 50 cannot be executed.

(Case where a Connection Request is Received from a Device of a Type Different from a Mobile Terminal)

The CPU 32 receives a connection request from a device of a type different from a mobile terminal and when a Provision Discovery Request signal including type information (for example, "Camera" or "Display") different from "Computer" is received from the device (S2 of FIG. 3), operates as follows.

For example, it is assumed that a Provision Discovery Request signal including type information "Camera" is received from a digital camera. The type information "Camera" represents a non-specific type device, like the type information "Computer". In this case, the CPU 32 executes the same processing as each processing after S4 of FIG. 3 for the digital camera. For example, in a state where the number of connections of the MFP 10 is equal to the upper limit number, the CPU 32 can establish a WFD connection with the digital camera and can receive print data from the digital camera.

Further, for example, it is assumed that a Provision Discovery Request signal including type information "Display" is received from the display 80. The type information "Display" represents a specific type device, unlike the type information "Computer". In a state where the number of connections of the MFP 10 is less than the upper limit number, when the Provision Discovery Request signal including the type information "Display" is received from the display 80, the CPU 32 establishes a WFD connection with the display 80. On the other hand, in a state where the number of connections of the MFP 10 is equal to the upper limit number, when the Provision Discovery Request signal including the type information "Display" is received from the display 80, the CPU 32 transmits a connection rejection notification to the display 80 and does not establish the WFD connection with the display 80.

Figure 5:
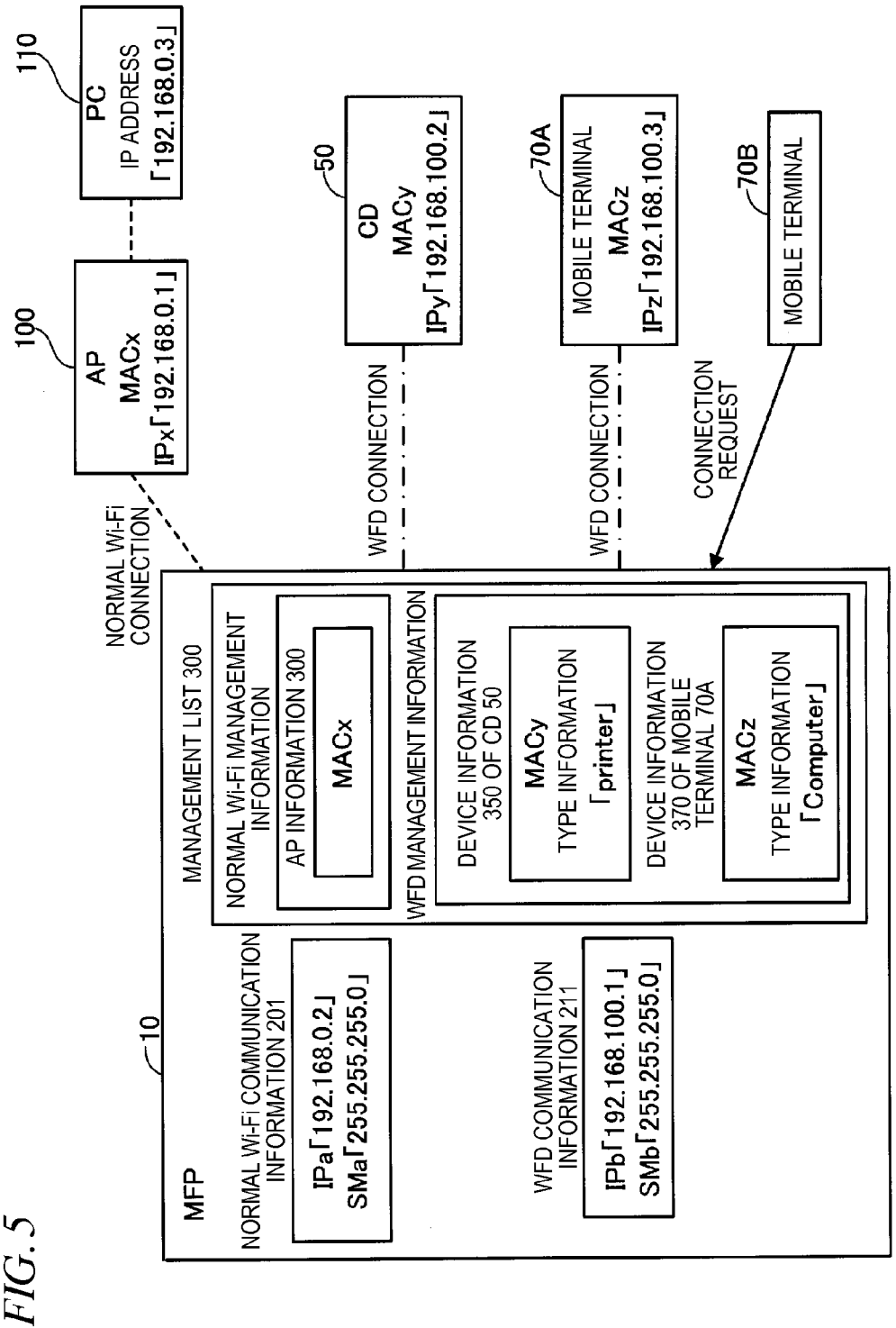
FIG. 5 shows an example of a situation in which an MFP establishes a normal Wi-Fi connection with an AP.

(Situation where MFP 10 Establishes Normal Wi-Fi Connection with AP 100: FIG. 5)

FIG. 5 shows a situation where the MFP 10 establishes a normal Wi-Fi connection with the AP 100, and the MFP 10 establishes two WFD connections with two CL devices 50 and 70A. That is, FIG. 5 shows a situation where, in S4 of FIG. 3, the MFP 10 establishes the normal Wi-Fi connection with the AP 100, and it is determined that the number of connections of the MFP 10 is equal to the upper limit number (that is, YES in S4).

In the situation of FIG. 5, the CPU 32 of the MFP 10 receives a connection request from the mobile terminal 70B (the trigger of the processing of FIG. 3), and then, when a Provision Discovery Request signal including the type information "Computer" is received from the mobile terminal 70B (S2 of FIG. 3), determines that the number of connections of the MFP 10 is equal to the upper limit number (that is, YES in S4). In this case, in S21 of FIG. 4, the CPU 32 executes an operation described below to broadcast an inquiry signal.

The CPU 32 first calculates the network address "192.168.0" of the normal Wi-FiNW using the IPa and the SMa of the MFP 10. Next, the CPU 32 attaches a value "255" to the network address "192.168.0" to generate a broadcast address "192.168.0.255". Subsequently, the CPU 32 generates and transmits an inquiry signal (hereinafter, referred to as "normal Wi-Fi inquiry signal") including the broadcast address "192.168.0.255" as a transmission destination IP address and a port number allocated to the printing application as a transmission destination port number. Accordingly, the normal Wi-Fi inquiry signal is broadcasted to the normal Wi-FiNW formed by the AP 100.

The printing application is an application which is provided by the vendor of the MFP 10. Therefore, the vendor of the MFP 10 can determine the port number of the printing application in advance. The port number is stored in the memory 34 of the MFP 10 in advance. Therefore, the CPU 32 can read the port number of the printing application from the memory 34 and can generate the normal Wi-Fi inquiry signal including the port number.

The CPU 32 calculates the network address "192.168.100" of the WFDNW using the IP address IPb and the SMb of the MFP 10. The network address "192.168.100" of the WFDNW is different from the network address "192.168.0" of the normal Wi-FiNW. Next, the CPU 32 attaches a value "255" to the network address "192.168.100" to generate a broadcast address "192.168.100.255". Subsequently, the CPU 32 generates and transmits an inquiry signal (hereinafter, referred to as "WFD inquiry signal") including the broadcast address "192.168.100.255" as a transmission destination IP address and a port number allocated to the printing application as a transmission destination port number. Accordingly, the WFD inquiry signal is broadcasted to the WFDNW formed by the MFP 10.

In S22 of FIG. 4, the CPU 32 monitors the reception of an activation signal from the AP 100 and the reception of two activation signals from the two devices 50 and 70A. If the normal Wi-Fi inquiry signal is received from the MFP 10, the AP 100 determines that the network address "192.168.0" in the transmission destination IP address "192.168.0.255" matches the network address of the normal Wi-FiNW formed by the AP 100. The AP 100 transfers the normal Wi-Fi inquiry signal to each device for which the normal Wi-Fi connection of the AP 100 is established. In FIG. 5, although only the PC 110 other than the MFP 10 is connected to the AP 100, when two or more devices other than the MFP 10 are connected to the AP 100, the AP 100 transfers the normal Wi-Fi inquiry signal to each of the two or more devices.

Among the devices (in the example of FIG. 5, only the PC 110) which are the final transmission destination of the normal Wi-Fi inquiry signal, a device on which the printing application is being activated transmits an activation signal including the IPa of the MFP 10 as a transmission destination IP address, and a device on which the printing application is not being activated does not transmit an activation signal. Therefore, the CPU 32 of the MFP 10 can receive the activation signal from the device, on which the printing application is being activated, through the AP 100. That is, the CPU 32 can receive the activation signal from the AP 100.

Among the CL devices (in the example of FIG. 5, the CD 50 and the mobile terminal 70A) which are the final transmission destination of the WFD inquiry signal, a CL device on which the printing application is being activated transmits an activation signal including the IPb of the MFP 10 as a transmission destination IP address, and a CL device on which the printing application is not being activated does not transmit an activation signal. Therefore, the CPU 32 of the MFP 10 can receive the activation signal from the CL device on which the printing application is being activated. As described above, the CD 50 transmits an activation signal even though the printing application is not provided. Accordingly, the CPU 32 of the MFP 10 receives the activation signal from the CD 50.

The CPU 32 receives at least one activation signal from the AP 100, and when the activation signal is received from each of the two CL devices 50 and 70A, determines that the activation signal is received from all of the three devices for which the wireless connection with the MFP 10 is established (YES in S22 of FIG. 4). In this case, the CPU 32 does not select the disconnection target device and transmits a connection rejection notification to the mobile terminal 70B (NO in S40 of FIGS. 3 and S42).

On the other hand, when any activation signal is not received from the AP 100, the CPU 32 determines to be NO in S22 of FIG. 4. The CPU 32 determines that the activation signal is not received from the AP 100 (YES in S23 and NO in S24), and selects the AP 100 as the disconnection target device. The CPU 32 transmits a leaving signal to the AP 100 to disconnect the normal Wi-Fi connection with the AP 100 (S44 of FIG. 3). Accordingly, the CPU 32 can establish a WFD connection with the mobile terminal 70B (S52).

While the CPU 32 has received the activation signal from the CD 50 which is one of the two CL devices 50 and 70A, when the activation signal has not been received from the other mobile terminal 70A and at least one activation signal is received from the AP 100, it is determined to be NO in S22 of FIG. 4. The CPU 32 determines to be YES in S23 and YES in S24 and proceeds to S26. In this case, there is one non-transmission CL device (that is, the mobile terminal 70A).

In S26, the CPU 32 determines that there is one non-transmission CL device (NO in S26), and selects the non-transmission CL device (that is, the mobile terminal 70A) as the disconnection target device (S29). Specifically, in the management list 300, there are two MAC addresses (that is, MACy and MACz) as WFD management information. The activation signal received from the CD 50 includes the MACy of the CD 50. The CPU 32 selects the MACz of the mobile terminal 70A different from the MACy included in the received activation signal between the MACy and the MACz in the management list 300. Accordingly, the CPU 32 can select one non-transmission CL device (that is, the mobile terminal 70A) as the disconnection target device. The CPU 32 transmits a disconnection signal to the mobile terminal 70A to disconnect the WFD connection with the mobile terminal 70A (S44 of FIG. 3). Accordingly, the CPU 32 can establish a WFD connection with the mobile terminal 70B (S52).

Figure 6:
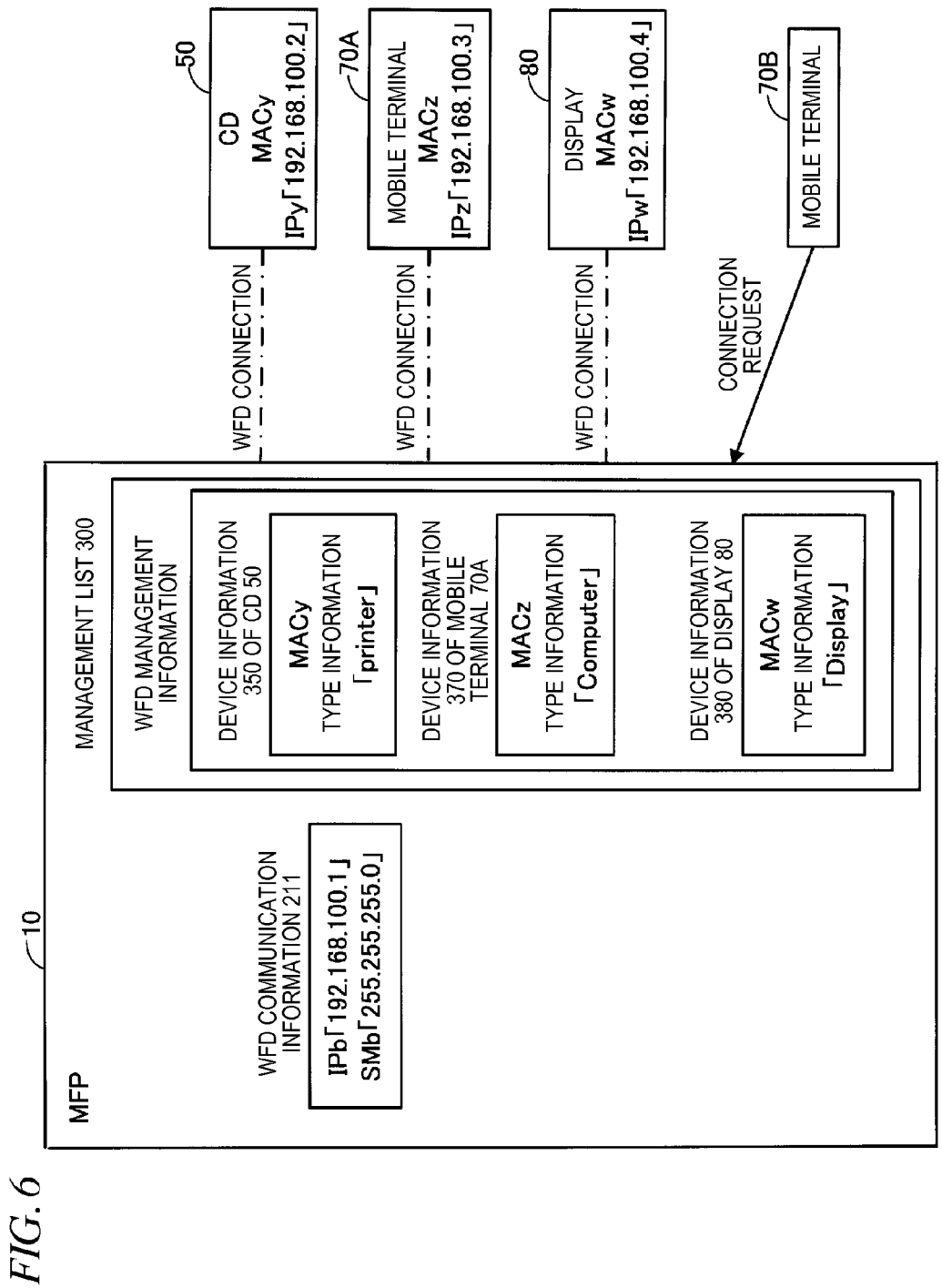
FIG. 6 shows an example of a situation in which an MFP does not establish a normal Wi-Fi connection with an AP.

(Situation Where MFP 10 does not Establish Normal Wi-Fi Connection with AP 100: FIG. 6)

FIG. 6 shows a situation where the MFP 10 does not establish the normal Wi-Fi connection with the AP 100, and the MFP 10 establish three WFD connections with three CL devices 50, 70A, and 80. That is, FIG. 6 shows a situation where the MFP 10 does not establish the normal Wi-Fi connection with the AP 100 and it is determined that the number of connections of the MFP 10 is equal to the upper limit number (that is, YES in S4).

In the situation of FIG. 6, the CPU 32 of the MFP 10 receives a connection request from the mobile terminal 70B (the trigger of the processing of FIG. 3), and then, when a Provision Discovery Request signal including type information "Computer" is received from the mobile terminal 70B (S2 of FIG. 3), determines that the number of connections of the MFP 10 is equal to the upper limit number (that is, YES in S4). In this case, in S21 of FIG. 4, the CPU 32 broadcasts a WFD inquiry signal to the WFDNW.

In S22 of FIG. 4, the CPU 32 monitors the reception of an activation signal from each of the three CL devices 50, 70A, and 80. When the activation signal is received from each of the three CL devices 50, 70A, and 80, the CPU 32 determines that the activation signal is received from all of the three devices for which the wireless connection with the MFP 10 is established (YES in S22). In this case, the CPU 32 does not select the disconnection target device and transmits a connection rejection notification to the mobile terminal 70B (NO in S40 of FIGS. 3 and S42).

On the other hand, while the CPU 32 has received the activation signal from each of the two CL devices including the CD 50 among the three CL devices 50, 70A, and 80, when the activation signal has not been received from the remaining one CL device, it is determined to be NO in S22 of FIG. 4. In this case, there is one non-transmission CL device. Hereinafter, it is assumed that the display 80 is a non-transmission CL device. Since the AP information 310 is not described in the management list 300, the CPU 32 determines that the normal Wi-Fi connection with the AP 100 is not established (NO in S23), then, determines that there is only one non-transmission CL device (NO in S26), and proceeds to S29.

In S29, the CPU 32 selects one non-transmission CL device (that is, the display 80) as the disconnection target device in the following manner. In the management list 300, there are three MAC addresses (that is, MACy, MACz, and MACw) as WFD management information. The MACw is the MAC address of the display 80 included in device information 380 of the display 80. Each of the two activation signals received from the two CL devices 50 and 70A includes the MAC address (that is, MACy or MACz) of the CL device as the transmission source of the activation signal. The CPU 32 selects the MACw of the display 80 different from the MACy and the MACz included in the received two activation signals among the MACy, the MACz, and the MACw in the management list 300. Accordingly, the CPU 32 can select one non-transmission CL device (that is, the display 80) as the disconnection target device. The CPU 32 transmits a disconnection signal to the display 80 to disconnect the WFD connection of the non-transmission CL device (that is, the display 80) (S44 of FIG. 3). Accordingly, the CPU 32 can establish a WFD connection with the mobile terminal 70B (S52).

While the CPU 32 has received the activation signal only from the CD 50 among the three CL devices, when the activation signal has not been received from the two CL devices 70A and 80, it is determined to be NO in S22 of FIG. 4. In this case, there are two non-transmission CL devices (that is, the mobile terminal 70A and the display 80). The CPU 32 determines that the normal Wi-Fi connection with the AP 100 is not established (NO in S23), then, determines that there are two non-transmission CL devices (YES in S26), and proceeds to S27.

In S27, the CPU 32 determines whether there is specific type device between the two non-transmission CL devices. Specifically, the CPU 32 first specifies the MACz and the MACw different from the MACy of the CD 50 included in the received activation signal among the MACy, the MACz, and the MACw in the management list 300. Next, when at least one of the two device information 370 and 380 including the MACz and the MACw includes the type information representing "Printer" or "Display", the CPU 32 determines that there is a specific type device (YES in S27), and when both the two device information 370 and 380 include the type information representing "Computer" or "Camera", the CPU 32 determines that there is no specific type device (NO in S27). In the example of FIG. 6, since the device information 380 includes the type information representing "Display" (that is, the type information representing "Display" is described in the management list 300), it is determined that there is a specific type device (YES in S27).

When it is determined that there is a specific type device (YES in S27), in S28, the CPU 32 selects the device information 380 of the display 80 including the type information representing "Printer" or "Display", thereby selecting one specific type device (that is, the display 80) as the disconnection target device. The CPU 32 transmits a disconnection signal to the display 80 to disconnect the WFD connection with the specific type device (that is, the display 80) (S44 of FIG. 3). Accordingly, the CPU 32 can establish a WFD connection with the mobile terminal 70B (S52).

In the situation of FIG. 6, for example, instead of the WFD connection established between the MFP 10 and the display 80, when a WFD connection is established between the MFP 10 and a mobile terminal (not shown), the CPU 32 determines that there is no specific type device (NO in S27). In this case, in S29, the CPU 32 selects one MAC address among the two MAC addresses different from the MACy of the CD 50, thereby selecting one non-specific type device (that is, one non-transmission CL device) as the disconnection target device. The CPU 32 transmits a disconnection signal to the disconnection target device to disconnect the WFD connection with the non-specific type device (S44 of FIG. 3). Accordingly, the CPU 32 can establish a WFD connection with the mobile terminal 70B (S52).

(Specific Case)

Subsequently, the details of a specific case which is realized according to the flowcharts of FIGS. 3 and 4 will be described referring to FIGS. 7 to 9.

(Case A: FIG. 7)

In a case A, the AP 100 forms a normal Wi-FiNW and establishes a normal Wi-Fi connection with each of the MFP 10 and the PC 110. The MFP 10 in the G/O state forms a WFDNW and establishes a WFD connection with each of the CD 50 and the mobile terminal 70A in the CL state. At this time, the number of connections of the MFP 10 is equal to the upper limit number "3".

If an operation to establish a WFD connection with the MFP 10 is performed by the user, the mobile terminal 70B in the device state transmits a connection request to the MFP 10.

If the connection request is received from the mobile terminal 70B, the MFP 10 executes communication of a Probe Response signal and a Provision Discovery Request signal with the mobile terminal 70B (S2). At this time, the MFP 10 does not execute communication of a Provision Discovery Response signal, WSC Exchange, and 4-Way Handshake with the mobile terminal 70B. Therefore, the mobile terminal 70B stands by for the establishment of the WFD connection with the MFP 10. If it is determined that the number of connections is equal to the upper limit number (YES in S4), in order to select a disconnection target device, the MFP 10 broadcasts a normal Wi-Fi inquiry signal to the normal Wi-FiNW and broadcasts a WFD inquiry signal to the WFDNW (S21 of FIG. 4).

Since the PC 110 is not activating the printing application, even if the normal Wi-Fi inquiry signal is received through the AP 100, the PC 110 does not transmit an activation signal to the MFP 10. The CD 50 transmits an activation signal to the MFP 10 even though the printing application is not provided. Since the mobile terminal 70A is activating the printing application, the mobile terminal 70A transmits an activation signal to the MFP 10.

Since the MFP 10 does not receive the activation signal through the AP 100 (NO in S22, YES in S23, and NO in S24), the MFP 10 selects the AP 100 as the disconnection target device (S25). In this way, the MFP 10 can appropriately select the AP 100, which is less likely to transmit the printing instruction to the MFP 10, as the disconnection target device. Next, the MFP 10 disconnects the normal Wi-Fi connection with the AP 100 (S42 of FIG. 3). The MFP 10 executes the continuation from communication of the Provision Discovery Request signal, that is, communication of the Provision Discovery Response signal, WSC Exchange, and 4-Way Handshake with the mobile terminal 70B in standby to establish a WFD connection with the mobile terminal 70B (S52). In this process, the mobile terminal 70B is transited from the device state to the CL state.

Next, the MFP 10 receives print data from the mobile terminal 70B using the WFDNW and executes a printing function (S54). If the reception of all print data is completed, the MFP 10 disconnects the WFD connection with the mobile terminal 70B (S56). In this process, the mobile terminal 70B returns from the CL state to the device state. Next, the MFP 10 transmits a connection request to the AP 100 and reestablishes a normal Wi-Fi connection with the AP 100 (S58).

(Case B: FIG. 8)

Figure 7:
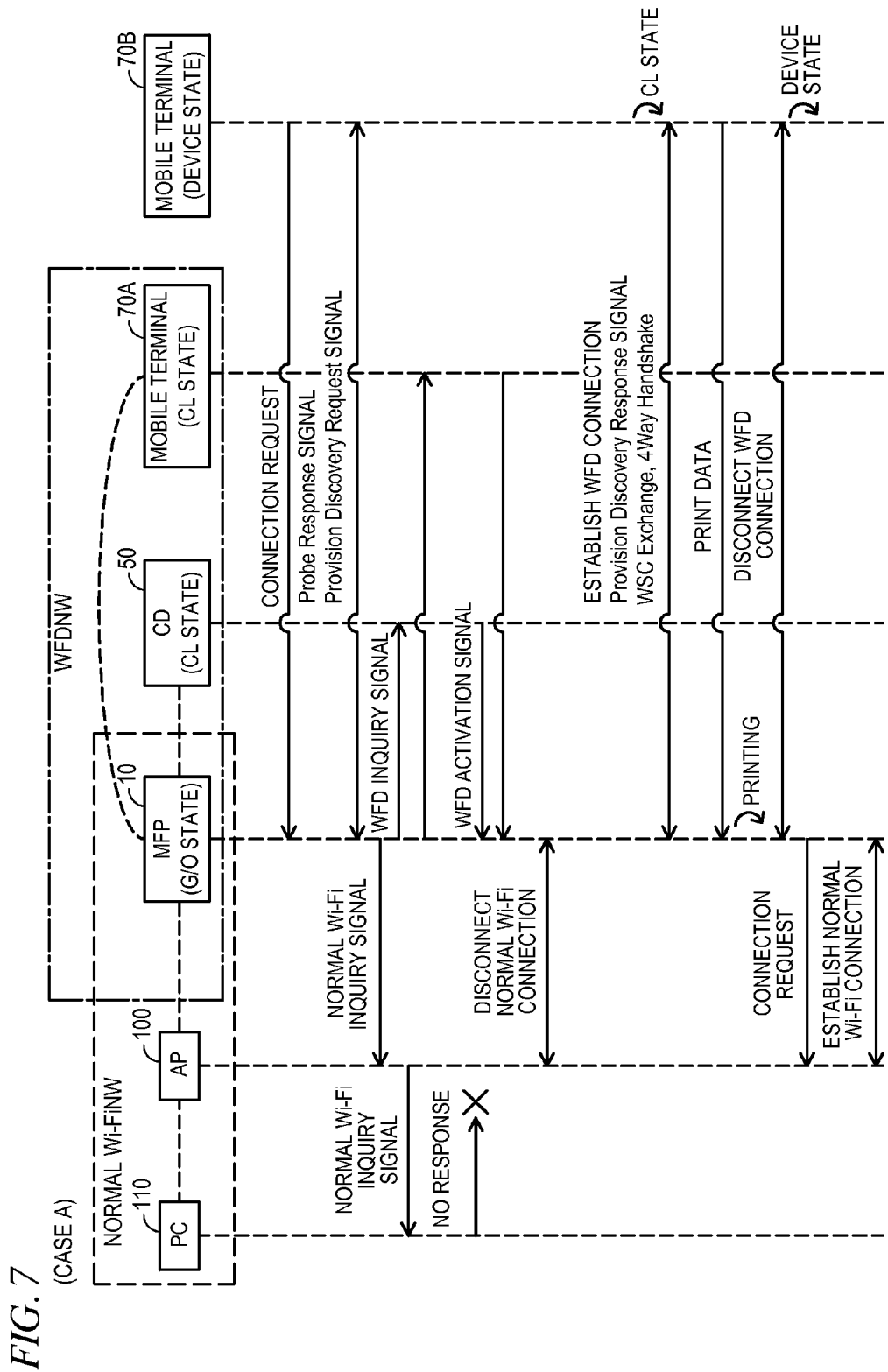
FIG. 7 is a sequence diagram of a case A where an activation signal is not received from a PC.

A case B is similar to the case A of FIG. 7. However, in the case B, unlike the case A of FIG. 7, since the mobile terminal 70A is not activating the printing application, the mobile terminal 70A does not transmit the activation signal to the MFP 10.

The MFP 10 does not receive the activation signal from the AP 100 and does not receive the activation signal from the mobile terminal 70A. Accordingly, in this case, as the candidates of the disconnection target device, there are the AP 100 which forms the normal Wi-FiNW and the mobile terminal 70A which belongs to the WFDNW. In this situation, the MFP 10 selects the AP 100 as the disconnection target device with higher priority (NO in S22 of FIG. 4, YES in S23, NO in S24, and S25) and disconnects the normal Wi-Fi connection with the AP 100. Each subsequent processing is the same as in the case A of FIG. 7.

If the WFD connection between the MFP 10 and the mobile terminal 70A is disconnected, for example, the mobile terminal 70A can execute processing (for example, processing for displaying the disconnection of the WFD connection with the MFP 10, processing for reestablishing the WFD connection with the MFP 10, or the like) due to the disconnection of the WFD connection. Accordingly, the user knows that the WFD connection between the MFP 10 and the mobile terminal 70A is disconnected. On the other hand, even if the normal Wi-Fi connection between the MFP 10 and the AP 100 is disconnected, since the normal Wi-Fi connection of the PC 110 is not disconnected, the PC 110 does not need to execute the processing due to the disconnection of the normal Wi-Fi connection. Therefore, the user cannot know that the normal Wi-Fi connection between the MFP 10 and the AP 100 is disconnected. Accordingly, in this illustrative embodiment, the MFP 10 selects the AP 100 as the disconnection target device with higher priority, instead of the mobile terminal 70A. Accordingly, the disconnection of the connection does not need to be known to the user.

(Case C: FIG. 9)

In a case C, the MFP 10 does not establish a normal Wi-Fi connection with the AP 100. The MFP 10 forms a WFDNW and establishes a WFD connection with each of the CD 50, the mobile terminal 70A, and the display 80. That is, the number of connections of the MFP 10 is equal to the upper limit number "3".

Each processing until the MFP 10 executes communication of a Probe Response signal and a Provision Discovery Request signal with the mobile terminal 70B is the same as in the case A of FIG. 7. The MFP 10 broadcasts a WFD inquiry signal (S21 of FIG. 4).

The CD 50 transmits an activation signal to the MFP 10. However, since each of the mobile terminal 70A and the display 80 is not activating the printing application, each of the mobile terminal 70A and the display 80 does not transmit an activation signal to the MFP 10.

The MFP 10 does not receive the activation signal from the mobile terminal 70A and does not receive the activation signal from the display 80. Accordingly, in this case, as the candidates of the disconnection target device, there are the mobile terminal 70A and the display 80. In this situation, the MFP 10 selects the display 80 which is a specific type device having type information "Display", as the disconnection target device with higher priority, instead of the mobile terminal 70A which is a non-specific type device having type information "Computer" (NO in S22 of FIG. 4, NO in S23, YES in S26, YES in S27, and S28), and disconnects the WFD connection with the display 80. In this way, in this illustrative embodiment, the MFP 10 can appropriately select a specific type device which is less likely to execute communication, instead of a non-specific type device which is highly likely to transmit the printing instruction to the MFP 10, and can disconnect the WFD connection with the specific type device.

Each processing until the WFD connection with the mobile terminal 70B is disconnected after print data is received from the mobile terminal 70B is the same as in the case A of FIG. 7. Next, the MFP 10 transmits an Invite signal to the display 80 and reestablishes a WFD connection with the display 80 (S58 in FIG. 3).

(Effect of Illustrative Embodiment)

As described in the case A to the case C, in a state where the wireless connections with the upper limit number of the three devices (for example, in the case A of FIG. 7, the AP 100, the CD 50, and the mobile terminal 70A) are established, when the connection request is received from the mobile terminal 70B, the MFP 10 of this illustrative embodiment transmits the inquiry signal to each of the three devices and inquires whether the device which is the final transmission destination of the inquiry signal is activating the printing application. The MFP 10 can appropriately select the disconnection target device based on the result of the inquiry. The MFP 10 disconnects the wireless connection with the disconnection target device. Therefore, the MFP 10 can establish the wireless connection with the mobile terminal 70B, and as a result, the MFP 10 can receive print data from the mobile terminal 70B and can execute the printing function.

(Correspondence)

The MFP 10 and the CD 50 are respectively an example of "function execution apparatus" and "specific slave station device". The WFDNW formed by the MFP 10 in the G/O state and the normal Wi-FiNW formed by the AP 100 are respectively an example of "first type network" and "second type network". In the case A of FIG. 7, the mobile terminal 70B is an example of "specific device". The three devices including the CD 50, the mobile terminal 70A, and the AP 100 are an example of "N devices" and "K devices". That is, in this illustrative embodiment, "N" and "K" are equal. However, when the AP 100 establishes the normal Wi-Fi connection with two or more devices other than the MFP 10, the normal Wi-Fi inquiry signal is transmitted to the two or more devices different from the MFP 10. The WFD inquiry signal is transmitted to the two CL devices. That is, in this case, while the MFP 10 can establish the wireless connection with the three devices simultaneously, the number of devices as the final transmission destination of the inquiry signal is equal to or greater than 4. That is, in general, the number devices which are the final transmission destination of the inquiry signal may be greater than the upper limit number "N" devices for which the wireless connection can be established by the function execution apparatus simultaneously. The upper limit number "N" may be "3" in this illustrative embodiment, any number may be used insofar as the number if an integer equal to or greater than "2". The CD 50, the mobile terminal 70A, and the PC 110 are an example of the device as "the final transmission destination of the inquiry signal". The CD 50 and the mobile terminal 70A are an example of "first type slave station device", and the PC 110 is an example of "second type slave station device".

The processing for receiving the connection request with the processing of FIG. 3 as a trigger, the processing of S21 of FIG. 4, and the processing of S22 to S29 of FIG. 4 are respectively an example of processing which is executed by "receiving operation", "inquiring operation" and "selecting operation". The processing of S44 of FIG. 3, the processing of S52, the processing of S56, and the processing of S58 are respectively an example of processing which is executed by "first disconnecting operation", "establishing operation", "second disconnecting operation" and "second establishing operation".

While the present invention has been shown and described with reference to certain illustrative embodiments thereof, it will be understood by those skilled in the art that various changes in form and details may be made therein without departing from the spirit and scope of the invention as defined by the appended claims.

(Modified Illustrative Embodiment 1)

In the above-described illustrative embodiment, in S20 of FIG. 3, the MFP 10 broadcasts the WFD inquiry signal to the WFDNW. Alternatively, the CPU 32 may stores each IP address of each CL device in the management list 300 and may unicast the WFD inquiry signal to each CL device with each IP address as the transmission destination.

(Modified Illustrative Embodiment 2)

In the above-described illustrative embodiment, the MFP 10 can establish the wireless connection with the three devices simultaneously, and the inquiry signal is transmitted to all of the three devices. That is, in the above-described illustrative embodiment, the number "K" of direct transmission destinations of the inquiry signal is equal to the upper limit number "N" of devices for which the wireless connection can be established by the function execution apparatus simultaneously. Alternatively, as described in the modified illustrative embodiment 1 described above, when a configuration in which the WFD inquiry signal is unicasted to each CL device is employed, the CPU 32 may not transmit the WFD inquiry signal to the CD 50. In this case, while the CPU 32 does not receive the activation signal from the CD 50, the CPU 32 does not select the CD 50 as the disconnection target device. That is, in this modified illustrative embodiment, while the MFP 10 can establish the wireless connection with the three devices simultaneously, the inquiry signal is transmitted only to the two devices. That is, in general, the number "K" of direct transmission destinations of the inquiry signal may not be equal to the upper limit number "N" devices for which the wireless connection can be established by the function execution apparatus simultaneously, and may be an integer equal to or less than "N".

(Modified Illustrative Embodiment 3)

In the above-described example, the device which is activating the printing application transmits the activation signal to the MFP 10, and the device which is not activating the printing application does not transmit the activation signal to the MFP 10. Alternatively, a configuration may be used, in which the device which is activating the printing application transmits a first type response signal (that is, the activation signal), which represents that the printing application is being activated, to the MFP 10, and the device which is not activating the printing application transmits a second type response signal, which represents that the printing application is not being activated, to the MFP 10. With this configuration, the CPU 32 of the MFP 10 confirms the details of the response signal, thereby distinguishing between the device which is activating the printing application and the device which is not activating the printing application.

That is, the processing for "selecting the disconnection target device based on the result of the inquiry" may be the processing for selecting the disconnection target device based on whether the activation signal is received from the devices which are the final transmission destination of the inquiry signal as in the above-described illustrative embodiment or the processing for selecting the disconnection target device based on the difference in the details of the response signal as in this illustrative embodiment.

(Modified Illustrative Embodiment 4)

In the above-described illustrative embodiment, although the MFP 10 can establish the normal Wi-Fi connection with the AP 100 according to the normal Wi-Fi system, it should suffice that at least the WFD connection with each CL device can be established according to the WFD system.

(Modified Illustrative Embodiment 5)

In the above-described illustrative embodiment, the CPU 32 may activate so-called SoftAP to operate the MFP 10 as a pseudo AP, instead of transiting the MFP 10 to the G/O state of WFD. In this illustrative embodiment, the CPU 32 can establish a wireless connection (that is, a normal Wi-Fi connection) between the MFP 10 operating as a pseudo AP and other devices to form a wireless network. The wireless network does not include a normal AP, called a wireless LAN access point, and is thus an example of "first type wireless network".

(Modified Illustrative Embodiment 6)

The "specific function" is not limited to the printing function, and may be a scanning function. The "specific application program" is not limited to the application program (that is, the printing application) for causing the MFP 10 to execute the printing function, and may be an application program (for example, a program for transmitting a scanning instruction to the MFP 10 and receiving scan data from the MFP 10) for causing the MFP 10 to execute the scanning function.

(Modified Illustrative Embodiment 7)

In the above-described illustrative embodiment, the CPU 32 of the MFP 10 executes the program 36 (that is, software) in the memory 34, whereby each processing of FIGS. 3 and 4 is realized. Alternatively, at least one of the respective processing of FIGS. 3 and 4 may be realized by hardware, such as a logic circuit.

The technical elements described in this specification or the drawings exhibit technical utility singly or in various combinations and are not limited to the combinations described in the appended claims as filed. The techniques illustrated in this specification or the drawings simultaneously attain a plurality of purposes, and attaining one of the purposes per se offers technical utility.

What is claimed is:

1. A printer comprising:
a printing execution unit; and
a controller configured to:
in a case where wireless connections are established between the printer and N devices, receive a wireless connection request from a mobile device different from the N devices, wherein N is an integer equal to or greater than 2 and is an upper limit number of devices with which the printer is capable of establishing wireless connections simultaneously;
when the wireless connection request is received from the mobile device in the case where wireless connections are established between the printer and N devices, transmit an inquiry signal to each of K devices among the N devices in order to inquire of each device, which is a final transmission destination of the inquiry signal, whether a print application program for causing the printer comprising the printing execution unit to execute printing is currently activated in each device, wherein K is an integer equal to or greater than 1 and equal to or less than N;
select a target device, for which the wireless connection is to be disconnected, among the K devices based on a result of the inquiry;
disconnect a wireless connection with the target device;
establish a wireless connection with the mobile device after the wireless connection with the target device is disconnected;
under a situation where the printer operates as a master station of a first type wireless network which includes no access point, in the case where the wireless connections with the N devices including one or more first type slave station devices operating as a slave station of the first type wireless network are established, receive the wireless connection request from the mobile device;
transmit the inquiry signal to each of the one or more first type slave station devices without transmitting through another device and monitor reception of an activation signal representing that the print application program is activated;
when the activation signal is received from an activation device, in which the print application program is activated, among the one or more first type slave station devices which are the final transmission destination of the inquiry signal, not select the activation device as the target device, for which the wireless connection is to be disconnected; and
when the activation signal is not received from a non-activation device, in which the print application program is not activated, among the one or more first type slave station devices which are the final transmission destination of the inquiry signal, select the non-activation device as the target device, for which the wireless connection is to be disconnected.

2. The printer according to claim 1, wherein the controller is configured to transmit the inquiry signal to each of the K devices with a port number allocated to the print application program as a transmission destination port number.

3. The printer according to claim 1, wherein the controller is further configured to:
acquire type information representing a device type from the one or more first type slave station devices; and
when there are two or more non-activation devices, select one non-activation device among the two or more non-activation devices as the target device using the type information of each of the two or more non-activation devices.

4. The printer according to claim 1, wherein the controller is configured to broadcast the inquiry signal to the first type wireless network so as to transmit the inquiry signal to each of the one or more first type slave station devices without transmitting through another device.

5. The printer according to claim 1,
wherein the one or more first type slave station devices include a general public line connectable slave station device configured to be connected to a general public line, and
wherein the controller is configured to receive the activation signal from the general public line connectable slave station device even though the general public line connectable slave station device does not have the print application program.

6. The printer according to claim 1, wherein the controller is further configured to:
disconnect the wireless connection with the mobile device after the printing is executed according to an instruction from the mobile device; and
reestablish a wireless connection with the target device after the wireless connection with the mobile device is disconnected.

7. A printer comprising:
a printing execution unit; and
a controller configured to:
in a case where wireless connections are established between the printer and N devices, receive a wireless connection request from a mobile device different from the N devices, wherein N is an integer equal to or greater than 2 and is an upper limit number of devices with which the printer is capable of establishing wireless connections simultaneously;
when the wireless connection request is received from the mobile device in the case where wireless connections are established between the printer and N devices, transmit an inquiry signal to each of K devices among the N devices in order to inquire of each device, which is a final transmission destination of the inquiry signal, whether a print application program for causing the printer to execute printing is currently activated in each device, wherein K is an integer equal to or greater than 1 and equal to or less than N;
select a target device, for which the wireless connection is to be disconnected, among the K devices based on a result of the inquiry;
disconnect a wireless connection with the target device;
establish a wireless connection with the mobile device after the wireless connection with the target device is disconnected;
under a situation where the printer operates as a slave station of a second type wireless network including an access point, in the case where the wireless connections with the N devices including the access point are established, receive the wireless connection request from the mobile device;
transmit the inquiry signal to the access point to transmit the inquiry signal to each of one or more second type slave station devices operating as the slave station of the second type wireless network through the access point and monitor reception of an activation signal representing that the print application program is activated;

when the activation signal is received from any one of the one or more second type slave station devices which are the final transmission destination of the inquiry signal, not select the access point as the target device for which the wireless connection is to be disconnected; and when the activation signal is not received from any one of the one or more second type slave station devices which are the final transmission destination of the inquiry signal, select the access point as the target device for which the wireless connection is to be disconnected.

8. The printer according to claim 7, wherein the controller is configured to broadcast the inquiry signal to the second type wireless network so as to transmit the inquiry signal to each of the one or more second type slave station devices through the access point.

9. The printer according to claim 7, wherein the controller is configured to transmit the inquiry signal to each of the K devices with a port number allocated to the print application program as a transmission destination port number.

10. The printer according to claim 7, wherein the controller is further configured to:

disconnect the wireless connection with the mobile device after the printing is executed according to an instruction from the mobile device; and reestablish a wireless connection with the target device after the wireless connection with the mobile device is disconnected.

11. A printer comprising:
a printing execution unit; and
a controller configured to:
   in a case where wireless connections are established between the printer and N devices, receive a wireless connection request from a mobile device different from the N devices, wherein N is an integer equal to or greater than 2 and is an upper limit number of devices with which the printer is capable of establishing wireless connections simultaneously;
   when the wireless connection request is received from the mobile device in the case where wireless connections are established between the printer and N devices, transmit an inquiry signal to each of K devices among the N devices in order to inquire of each device, which is a final transmission destination of the inquiry signal, whether a print application program for causing the printer comprising the printing execution unit to execute printing is currently activated in each device, wherein K is an integer equal to or greater than 1 and equal to or less than N;
   select a target device, for which the wireless connection is to be disconnected, among the K devices based on a result of the inquiry;
   disconnect a wireless connection with the target device; and
   establish a wireless connection with the mobile device after the wireless connection with the target device is disconnected;
   under a situation where the printer operates as a master station of a first type wireless network which includes no access point and operates as a slave station of a second type wireless network which includes an access point, in the case where the wireless connections with the N devices including one or more first type slave station devices operating as a slave station of the first type wireless network and the access point are established, receive the wireless connection request from the mobile device;
   transmit the inquiry signal to each of the one or more first type slave station devices without transmitting through another device and monitor reception of an activation signal representing that the print application program is activated;
   transmit the inquiry signal to the access point to transmit the inquiry signal to each of one or more second type slave station devices operating as the slave station of the second type wireless network through the access point and monitor reception of the activation signal; and
   when the activation signal is not received from at least one device among the one or more first type slave station devices and the activation signal is not received from any one of the one or more second type slave station devices, select the access point as the target device.

12. The printer according to claim 11, wherein the controller is configured to transmit the inquiry signal to each of the K devices with a port number allocated to the print application program as a transmission destination port number.

13. The printer according to claim 11, wherein the controller is further configured to:

disconnect the wireless connection with the mobile device after the printing is executed according to an instruction from the mobile device; and reestablish a wireless connection with the target device after the wireless connection with the mobile device is disconnected.

* * * * *